United States Patent
Uchida et al.

(10) Patent No.: US 12,057,564 B2
(45) Date of Patent: Aug. 6, 2024

(54) POSITIVE ELECTRODE ACTIVE MATERIAL AND BATTERY INCLUDING THE SAME

(71) Applicant: Panasonic Intellectual Property Management Co., Ltd., Osaka (JP)

(72) Inventors: Shuhei Uchida, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 840 days.

(21) Appl. No.: 17/152,801

(22) Filed: Jan. 20, 2021

(65) Prior Publication Data

US 2021/0143397 A1     May 13, 2021

Related U.S. Application Data

(63) Continuation of application No. PCT/JP2019/016946, filed on Apr. 22, 2019.

(30) Foreign Application Priority Data

Aug. 31, 2018 (JP) .................................. 2018-163178

(51) Int. Cl.
    *H01M 4/131*       (2010.01)
    *H01M 4/36*         (2006.01)
    (Continued)

(52) U.S. Cl.
    CPC ........... *H01M 4/131* (2013.01); *H01M 4/364* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS 10,886,529 B2 *   1/2021   Ishikawa ............... H01M 4/505
11,201,319 B2 *   12/2021   Ishikawa ............... H01M 4/505
(Continued)

FOREIGN PATENT DOCUMENTS

EP           3203552 A1     8/2017
JP           2013-041840    2/2013
(Continued)

OTHER PUBLICATIONS

International Search Report of PCT application No. PCT/JP2019/016946 dated Jul. 9, 2019.
(Continued)

*Primary Examiner* — Jonathan Crepeau
(74) *Attorney, Agent, or Firm* — Rimon P.C.

(57) ABSTRACT

A positive electrode active material includes a lithium composite oxide having a crystal structure belonging to the space group Fd-3m and has an integrated intensity ratio $I_{(18°-20°)}/I_{(43°-46°)}$ of greater than or equal to 0.05 and less than or equal to 0.90 and an integrated intensity ratio $I_{(63°-65°)}/I_{(17°-19°)}$ of greater than or equal to 0.8 and less than or equal to 2.0. The integrated intensity ratio $I_{(18°-20°)}/I_{(43°-46°)}$ is a ratio of an integrated intensity $I_{(18°-20°)}$ to an integrated intensity $I_{(43°-46°)}$. The integrated intensity ratio $I_{(63°-65°)}/I_{(17°-19°)}$ is a ratio of an integrated intensity $I_{(63°-65°)}$ to an integrated intensity $I_{(17°-19°)}$. The integrated intensity $I_{(A°-B°)}$ is an integrated intensity of a maximum peak present in a range of angle of diffraction 2θ greater than or equal to A° and less than or equal to B° in the X-ray diffraction pattern of the positive electrode active material.

24 Claims, 1 Drawing Sheet

(51) Int. Cl.
H01M 4/505 (2010.01)
H01M 4/525 (2010.01)
H01M 10/0525 (2010.01)
H01M 4/02 (2006.01)

(52) U.S. Cl.
CPC ....... H01M 4/525 (2013.01); H01M 10/0525 (2013.01); *C01P 2002/74* (2013.01); *H01M 2004/028* (2013.01)

(56) References Cited

U.S. PATENT DOCUMENTS

| | | | |
|---|---|---|---|
| 11,605,814 B2* | 3/2023 | Natsui | C01G 45/1228 |
| 2013/0313471 A1 | 11/2013 | Endo et al. | |
| 2014/0058598 A1 | 2/2014 | Matsui et al. | |
| 2019/0036113 A1 | 1/2019 | Ishikawa et al. | |

FOREIGN PATENT DOCUMENTS

| | | |
|---|---|---|
| JP | 2014-060143 A | 4/2014 |
| WO | 2012/091015 A1 | 7/2012 |

OTHER PUBLICATIONS

Indian Examination Report dated Oct. 7, 2022 for the related Indian Patent Application No. 202147003120.
The Extended European Search Report dated Oct. 12, 2021 for the related European Patent Application No. 19854882.8.

* cited by examiner

POSITIVE ELECTRODE ACTIVE MATERIAL AND BATTERY INCLUDING THE SAME

BACKGROUND

1. Technical Field

The present disclosure relates to a positive electrode active material for batteries and a battery including the positive electrode active material.

2. Description of the Related Art

Japanese Unexamined Patent Application Publication No. 2013-041840 discloses a spinel lithium manganese oxide having a chemical composition represented by general formula $Li_{1+x}M_yMn_{2-x-y}O_4$ and a maximum particle diameter $D_{100}$ of less than or equal to 15 µm. The half-width of the (400) plane which is determined by X-ray diffractometry is less than or equal to 0.30. The ratio $I_{400}/I_{111}$ of the peak intensity $I_{400}$ of the (400) plane to the peak intensity $I_{111}$ of the (111) plane is greater than or equal to 0.33. In Japanese Unexamined Patent Application Publication No. 2013-041840, M is at least one metal element selected from the group consisting of Al, Co, Ni, Mg, Zr, and Ti, x is greater than or equal to 0 and less than or equal to 0.33, and y is greater than or equal to 0 and less than or equal to 0.2.

SUMMARY

One non-limiting and exemplary embodiment provides a positive electrode active material with which a battery having a low voltage drop may be produced.

In one general aspect, the techniques disclosed here feature a positive electrode active material including a lithium composite oxide having a crystal structure belonging to space group Fd-3m, wherein the following mathematical formulas (I) and (II) are satisfied:

$$0.05 \leq \text{Integrated intensity ratio } I_{(18°-20°)}/I_{(43°-46°)} \leq 0.90 \quad (I),$$

$$0.8 \leq \text{Integrated intensity ratio } I_{(63°-65°)}/I_{(17°-19°)} \leq 2.0 \quad (II),$$

where the integrated intensity ratio $I_{(18°-20°)}/I_{(43°-46°)}$ is a ratio of an integrated intensity $I_{(18°-20°)}$ to an integrated intensity $I_{(43°-46°)}$, the integrated intensity ratio $I_{(63°-65°)}/I_{(17°-19°)}$ is a ratio of an integrated intensity $I_{(63°-65°)}$ to an integrated intensity $I_{(17°-19°)}$, the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material, the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material, the integrated intensity $I_{(63°-65°)}$ is an integrated intensity of a third peak that is a maximum peak present in a range of angle of diffraction 2θ greater than or equal to 63° and less than or equal to 65° in the X-ray diffraction pattern of the positive electrode active material, and the integrated intensity $I_{(17°-19°)}$ is an integrated intensity of a fourth peak that is a maximum peak present in a range of angle of diffraction 2θ greater than or equal to 17° and less than or equal to 19° in the X-ray diffraction pattern of the positive electrode active material.

A battery having a low voltage drop may be produced using the positive electrode active material according to an embodiment of the present disclosure. A battery according to an embodiment of the present disclosure, which includes a positive electrode including the positive electrode active material, a negative electrode, and an electrolyte, may have a low voltage drop.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
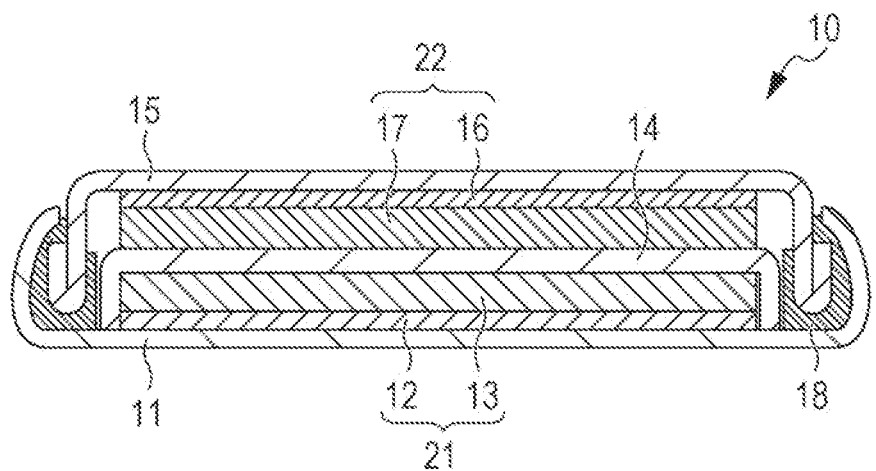
FIG. 1 is a cross-sectional view of a battery according to Embodiment 2.

Embodiments of the present disclosure are described below.

Embodiment 1

A positive electrode active material according to Embodiment 1 includes a lithium composite oxide having a crystal structure belonging to the space group Fd-3m, wherein the following mathematical formulas (I) and (II) are satisfied:

$$0.05 \leq \text{Integrated intensity ratio } I_{(18°-20°)}/I_{(43°-46°)} \leq 0.90 \quad (I),$$

$$0.8 \leq \text{Integrated intensity ratio } I_{(63°-65°)}/I_{(17°-19°)} \leq 2.0 \quad (II),$$

where the integrated intensity ratio $I_{(18°-20°)}/I_{(43°-46°)}$ is a ratio of an integrated intensity $I_{(18°-20°)}$ to an integrated intensity $I_{(43°-46°)}$, the integrated intensity ratio $I_{(63°-65°)}/I_{(17°-19°)}$ is a ratio of an integrated intensity $I_{(63°-65°)}$ to an integrated intensity $I_{(17°-19°)}$, the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material, the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material, the integrated intensity $I_{(63°-65°)}$ is an integrated intensity of a third peak that is a maximum peak present in a range of angle of diffraction 2θ greater than or equal to 63° and less than or equal to 65° in the X-ray diffraction pattern of the positive electrode active material, and the integrated intensity $I_{(17°-19°)}$ is an integrated intensity of a fourth peak that is a maximum peak present in a range of angle of diffraction 2θ greater than or equal to 17° and less than or equal to 19° in the X-ray diffraction pattern of the positive electrode active material.

The positive electrode active material may be used for providing a battery having a low voltage drop. The expression "battery having a low voltage drop" used herein means a battery that has a high average-operating-voltage retention rate even after repeated charge-discharge cycles. Furthermore, the battery has a high capacity.

A lithium ion battery that includes the positive electrode active material according to Embodiment 1 has an oxidation-reduction potential of about 3.4 V (vs Li/Li$^+$). The lithium ion battery generally has a capacity of greater than or equal to 250 mAh/g.

The lithium composite oxide included in the positive electrode active material according to Embodiment 1 has a crystal structure belonging to the space group Fd-3m.

In an X-ray diffraction pattern of the lithium composite oxide, the integrated intensity ratio $I_{(18°-20°)}/I_{(43°-46°)}$ is greater than or equal to 0.05 and less than or equal to 0.90. The integrated intensity ratio $I_{(18°-20°)}/I_{(43°-46°)}$ is a parameter that may be used as a measure of cation mixing that occurs in the lithium composite oxide having a crystal structure belonging to the space group Fd-3m. The term "cation mixing" used herein refers to a state of the crystal structure of the lithium composite oxide in which lithium ions are replaced with cations of a transition metal. The smaller the amount of cation mixing, the higher the integrated intensity ratio $I_{(18°-20°)}/I_{(43°-46°)}$. The larger the amount of cation mixing, the lower the integrated intensity ratio $I_{(18°-20°)}/I_{(43°-46°)}$.

In Embodiment 1, the lithium composite oxide includes a Li layer and a transition metal layer. Since the lithium composite oxide has a crystal structure belonging to the space group Fd-3m and an integrated intensity ratio $I_{(18°-20°)}/I_{(43°-46°)}$ of greater than or equal to 0.05 and less than or equal to 0.90, it is considered that the amount of cation mixing is relatively large. Therefore, it is considered that cation mixing between lithium ions and cations of a transition metal occurs all over "the 8a sites, the 16d sites, and the 16c sites", which correspond to the cation sites included in the Li layer and the transition metal layer. The Li occupancies of the 8a sites, the 16d sites, and the 16c sites are not limited as long as the integrated intensity ratio $I_{(18°-20°)}/I_{(43°-46°)}$ is greater than or equal to 0.05 and less than or equal to 0.90.

Cation mixing may enhance not only the diffusibility of Li inside the Li layer but also the diffusibility of Li inside the transition metal layer. In addition, the diffusibility of Li between the Li layer and the transition metal layer may also be enhanced. That is, Li may be diffused all over the cation sites in an efficient manner. Accordingly, the lithium composite oxide is suitable for increasing battery capacity compared with the regularly-arrayed (i.e., the amount of cation mixing is small) lithium composite oxides known in the related art.

If the integrated intensity ratio $I_{(18°-20°)}/I_{(43°-46°)}$ is lower than 0.05, the Li occupancy of the transition metal layer is excessively high and the crystal structure is thermodynamically unstable. As a result, the crystal structure may collapse upon the deintercalation of Li during charging. Consequently, battery capacity may be reduced to an insufficient degree.

If the integrated intensity ratio $I_{(18°-20°)}/I_{(43°-46°)}$ is higher than 0.90, the amount of cation mixing may be reduced and, consequently, the Li occupancy of the transition metal layer may be reduced. As a result, the number of three-dimensional Li diffusion channels may be reduced. This may degrade the diffusibility of Li. Consequently, battery capacity may be reduced to an insufficient degree.

As described above, in Embodiment 1, it is considered that a sufficient degree of cation mixing between lithium ions and transition metal cations occurs since the lithium composite oxide has an integrated intensity ratio $I_{(18°-20°)}/I_{(43°-46°)}$ of greater than or equal to 0.05 and less than or equal to 0.90. This may increase the number of three-dimensional lithium diffusion channels present in the lithium composite oxide and enable the intercalation and deintercalation of a further large amount of Li.

In Embodiment 1, since the lithium composite oxide has a crystal structure belonging to the space group Fd-3m and an integrated intensity ratio $I_{(18°-20°)}/I_{(43°-46°)}$ of greater than or equal to 0.05 and less than or equal to 0.90, a three-dimensional network constituted by transition metal-anion octahedrons, which serve as pillars, may be formed and the crystal structure may remain stable even when a large amount of Li is deintercalated. Consequently, the positive electrode active material according to Embodiment 1 enables the intercalation and deintercalation of a further large amount of Li. That is, the positive electrode active material according to Embodiment 1 may be suitable for increasing battery capacity. For the same reasons, the positive electrode active material according to Embodiment 1 may be suitable for providing a battery having excellent cycle characteristics.

It is considered that, in a crystal structure belonging to the space group Fd-3m, the layered structure is likely to be maintained upon the deintercalation of a large amount of Li, compared with a layered structure belonging to the space group R-3m. Similarly, it is considered that, in a crystal structure belonging to the space group Fd-3m, the crystal structure is resistant to collapse upon the deintercalation of a large amount of Li, compared with a layered structure belonging to the space group R-3m.

Japanese Unexamined Patent Application Publication No. 2013-041840 discloses a positive electrode material including a lithium composite oxide having a crystal structure belonging to the space group Fd-3m, in which the amount of cation mixing between lithium atoms and transition metal cations is insufficient. The lithium composite oxide disclosed in Japanese Unexamined Patent Application Publication No. 2013-041840 satisfies approximately $2 \leq I_{(111)}/I_{(400)} \leq 3$. It is described that this markedly reduces the irregularity of the crystal structure and thereby enhances battery characteristics. In general, in an XRD pattern obtained using CuKα radiation, in the case of a crystal structure belonging to the space group Fd-3m, a maximum peak present in the range of diffraction angle 2θ of greater than or equal to 18° and less than or equal to 20° reflects the (111) plane, while a maximum peak present in the range of diffraction angle 2θ of greater than or equal to 43° and less than or equal to 46° reflects the (400) plane. That is, $2 \leq I_{(111)}/I_{(400)} \leq 3$ corresponds to $2 \leq$ Integrated intensity ratio $I_{(18°-20°)}/I_{(43°-46°)} \leq 3$.

In other words, the related arts, such as Japanese Unexamined Patent Application Publication No. 2013-041840, have never disclosed or suggested a lithium composite oxide having an integrated intensity ratio $I_{(18°-20°)}/I_{(43°-46°)}$ of greater than or equal to 0.05 and less than or equal to 0.90 and an integrated intensity ratio $I_{(63°-65°)}/I_{(17°-19°)}$ of greater than or equal to 0.8 and less than or equal to 2.0.

In Embodiment 1, the positive electrode active material includes a lithium composite oxide having a crystal structure belonging to the space group Fd-3m, an integrated intensity ratio $I_{(18°-20°)}/I_{(43°-46°)}$ of greater than or equal to 0.05 and less than or equal to 0.90, and an integrated intensity ratio $I_{(63°-65°)}/I_{(17°-19°)}$ of greater than or equal to 0.8 and less than or equal to 2.0. A battery having an unexpectedly large capacity may be produced using the positive electrode active material.

In order to further increase battery capacity, the integrated intensity ratio $I_{(18°-20°)}/I_{(43°-46°)}$ may be greater than or equal to 0.05 and less than or equal to 0.70.

In order to further increase battery capacity, the integrated intensity ratio $I_{(18°-20°)}/I_{(43°-46°)}$ may be greater than or equal to 0.05 and less than or equal to 0.30.

In order to further increase battery capacity, the integrated intensity ratio $I_{(18°-20°)}/I_{(43°-46°)}$ may be greater than or equal to 0.10 and less than or equal to 0.70.

In order to further increase battery capacity, the integrated intensity ratio $I_{(18°-20°)}/I_{(43°-46°)}$ may be greater than or equal to 0.60 and less than or equal to 0.70.

The integrated intensity ratio $I_{(63°-65°)}/I_{(17°-19°)}$ is greater than or equal to 0.8 and less than or equal to 2.0.

The integrated intensity ratio $I_{(63°-65°)}/I_{(17°-19°)}$ is a parameter that may be used as a measure of the proportion of a crystal structure belonging to the space group Fd-3m which is present in the lithium composite oxide. It is considered that, the higher the proportion of a crystal structure belonging to the space group Fd-3m, the higher the integrated intensity ratio $I_{(63°-65°)}/I_{(17°-19°)}$.

In the case where a common positive electrode active material is used at high potentials, the decomposition (e.g., side reaction) of an electrolyte is facilitated and a transition metal may become eluted from the surface of the positive electrode active material. In the case where a common positive electrode active material is used at high potentials, furthermore, anionic species included in the positive electrode active material may become deintercalated as a gas. This may result in the dislocation of the crystal structure of the positive electrode active material and a reduction in the operating voltage. Since the lithium composite oxide has an integrated intensity ratio $I_{(63°-65°)}/I_{(17°-19°)}$ of greater than or equal to 0.8 and less than or equal to 2.0, the lithium composite oxide has a crystal structure belonging to the space group Fd-3m. A phase having a crystal structure belonging to the space group Fd-3m is resistant to structure destabilization which may occur during charging and discharging. Therefore, the dislocation of the crystal structure of the positive electrode active material may be reduced in the positive electrode active material according to Embodiment 1. Thus, a battery having a low average operating voltage drop may be produced using the positive electrode active material according to Embodiment 1.

The integrated intensity ratio $I_{(63°-65°)}/I_{(17°-19°)}$ may be greater than or equal to 1.3 and less than or equal to 1.6.

When the integrated intensity ratio) $I_{(63°-65°)}/I_{(17°-19°)}$ is greater than or equal to 1.3 and less than or equal to 1.6, the dislocation of the crystal structure of the positive electrode active material may be further reduced in the lithium composite oxide. Consequently, the drop in the average operating voltage of the battery may be further reduced.

The integrated intensity of an X-ray diffraction peak may be calculated using, for example, a software attached to an X-ray diffraction apparatus (e.g., "PDXL" attached to a powder X-ray diffraction apparatus produced by Rigaku Corporation). In such a case, the integrated intensity of an X-ray diffraction peak is determined by, for example, calculating the area of the diffraction peak from the height and half-width of the diffraction peak.

In general, in an XRD pattern obtained using CuKα radiation, in the case of a crystal structure belonging to the space group C2/m, a maximum peak present in the range of diffraction angle 2θ of greater than or equal to 18° and less than or equal to 20° reflects the (001) plane, while a maximum peak present in the range of diffraction angle 2θ of greater than or equal to 43° and less than or equal to 46° reflects the (114) plane.

In general, in an XRD pattern obtained using CuKα radiation, in the case of a crystal structure belonging to the space group R-3m, a maximum peak present in the range of diffraction angle 2θ of greater than or equal to 18° and less than or equal to 20° reflects the (003) plane, while a maximum peak present in the range of diffraction angle 2θ of greater than or equal to 43° and less than or equal to 46° reflects the (104) plane.

In general, in an XRD pattern obtained using CuKα radiation, in the case of a crystal structure belonging to the space group Fm-3m, no diffraction peak is present in the range of diffraction angle 2θ of greater than or equal to 18° and less than or equal to 20°. No diffraction peak is present in the range of diffraction angle 2θ of greater than or equal to 20° and less than or equal to 23°. A maximum peak present in the range of diffraction angle 2θ of greater than or equal to 43° and less than or equal to 46° reflects the (200) plane.

In general, in an XRD pattern obtained using CuKα radiation, in the case of a cubic crystal, that is, for example, a crystal structure belonging to the space group Fd-3m, a maximum peak present in the range of diffraction angle 2θ of greater than or equal to 18° and less than or equal to 20° reflects the (111) plane, while a maximum peak present in the range of diffraction angle 2θ of greater than or equal to 43° and less than or equal to 46° reflects the (400) plane.

An electron diffraction measurement may be conducted using a transmission electron microscope (hereinafter, abbreviated as "TEM") in addition to the above X-ray diffraction measurement. The space group of the lithium composite oxide may be identified by observing an electron diffraction pattern by a known method. Whether the lithium composite oxide has a crystal structure belonging to the space group Fd-3m may be confirmed in the above-described manner.

In Embodiment 1, the lithium composite oxide may include a first lithium composite oxide and a second lithium composite oxide. The first lithium composite oxide has a crystal structure belonging to the space group Fd-3m and is in a bulk form. The second lithium composite oxide has a crystal structure belonging to the space group Fd-3m. At least a part of the surface of the first lithium composite oxide is covered with the second lithium composite oxide. Although both first and second lithium composite oxides have a crystal structure belonging to the space group Fd-3m, the first and second lithium composite oxides are different compounds. A crystal structure belonging to the space group Fd-3m is a spinel crystal structure. In other words, the second lithium composite oxide may be identified as a spinel surface layer that covers at least a part of the surface of the first lithium composite oxide.

The state in which "the second lithium composite oxide covers at least a part of the surface of the first lithium composite oxide" may be a state in which the second lithium composite oxide is in contact with at least a part of the surface of the first lithium composite oxide. The second lithium composite oxide may be deposited on the surface of the first lithium composite oxide in the form of a coating film.

The second lithium composite oxide may cover all over the surface of the first lithium composite oxide. For example, the positive electrode active material according to Embodiment 1 may have a core-shell structure constituted by the first lithium composite oxide serving as a core and the second lithium composite oxide serving as a shell that covers the surface of the core.

In the case where the entire surface of the first lithium composite oxide is covered with the second lithium composite oxide, the dislocation of the crystal structure of the positive electrode active material may be reduced with further effect and, consequently, the voltage drop may be further reduced.

Examples of the first lithium composite oxide include the first and second examples below. Hereinafter, all the descriptions of the first lithium composite oxide apply to not only the first and second examples but all the first lithium composite oxides, unless otherwise specified that the first lithium composite oxide is "first example" or "second example".

The first lithium composite oxide according to the first example may have a crystal structure belonging to the space group Fd-3m. In the case where the first lithium composite oxide is the first lithium composite oxide according to the first example, the integrated intensity ratio $I_{(18°-20°)}/I_{(43°-46°)}$ may be a parameter used as a measure of cation mixing that occurs in the first lithium composite oxide.

In Embodiment 1, the first lithium composite oxide includes a Li layer and a transition metal layer. Since the integrated intensity ratio $I_{(18°-20°)}/I_{(43°-46°)}$ is greater than or equal to 0.05 and less than or equal to 0.90, as described above, it is considered that a relatively large amount of cation mixing occurs in the first lithium composite oxide according to the first example. Therefore, it is considered that cation mixing between lithium ions and cations of a transition metal occurs all over "the 8a sites, the 16d sites, and the 16c sites", which correspond to the cation sites included in the Li layer and the transition metal layer. The Li occupancies of the 8a sites, the 16d sites, and the 16c sites are not limited as long as the integrated intensity ratio $I_{(18°-20°)}/I_{(43°-46°)}$ is greater than or equal to 0.05 and less than or equal to 0.90.

As described above, cation mixing may enhance not only the diffusibility of Li inside the Li layer but also the diffusibility of Li inside the transition metal layer. In addition, the diffusibility of Li between the Li layer and the transition metal layer may be enhanced. That is, Li may be diffused all over the cation sites in an efficient manner. Accordingly, the first lithium composite oxide is suitable for increasing battery capacity compared with the regularly-arrayed (i.e., the amount of cation mixing is small) lithium composite oxides known in the related art.

The first lithium composite oxide according to the second example may be a multiphase mixture including a first phase having a crystal structure belonging to the space group Fm-3m and a second phase having a crystal structure belonging to a space group other than the space group Fm-3m.

A crystal structure belonging to the space group Fm-3m is a disordered rock-salt structure including randomly arranged lithium ions and transition metal cations. Accordingly, a crystal structure belonging to the space group Fm-3m is capable of occluding a larger amount of Li in the crystal structure than $LiCoO_2$, which is a material commonly used in the related art. However, the diffusibility of Li in a crystal structure belonging to the space group Fm-3m is not high, because Li can diffuse through only adjacent Li atoms or holes.

On the other hand, the diffusibility of Li in a crystal structure belonging to a space group other than the space group Fm-3m (e.g., the space group Fd-3m, the space group R-3m, or the space group C2/m) is high, because two-dimensional Li diffusion paths are present in the crystal structure. A crystal structure belonging to a space group other than the space group Fm-3m has a strong network constituted by transition metal-anion octahedrons and is therefore stable.

Since the crystal structure of the first lithium composite oxide according to the second example includes the first phase and the second phase in a mixed manner, the first lithium composite oxide according to the second example may increase battery capacity. As a result, a long-life battery may be provided.

In the first lithium composite oxide according to the second example, plural regions constituted by the first phase and plural regions constituted by the second phase may be three-dimensionally randomly arranged.

The three-dimensional random array increases the number of three-dimensional Li diffusion channels and thereby enables the intercalation and deintercalation of a further large amount of Li. Consequently, battery capacity may be increased.

In Embodiment 1, the second example of the first lithium composite oxide is a multiphase mixture. For example, a layered structure consisting of a bulk layer and a coat layer covering the bulk layer does not correspond to the multiphase mixture according to an embodiment of the present disclosure. The term "multiphase mixture" used herein refers to a substance including plural phases. Plural materials corresponding to the respective phases may be mixed with one another in the production of the first lithium composite oxide.

Whether the first lithium composite oxide is a multiphase mixture may be determined by X-ray diffractometry and electron diffractometry as described below. Specifically, a lithium composite oxide is identified as a multiphase mixture when a spectrum of the lithium composite oxide obtained by X-ray diffractometry and electron diffractometry contains peaks showing the characteristics of the plural phases.

Use of a multiphase mixture increases the number of three-dimensional Li diffusion channels and enables the intercalation and deintercalation of a further large amount of Li. As a result, battery capacity may be increased.

In order to increase battery capacity, the second phase included in the first lithium composite oxide according to the second example may have a crystal structure belonging to at least one space group selected from the group consisting of the space group Fd-3m, the space group R-3m, and the space group C2/m.

In order to increase battery capacity, the second phase included in the first lithium composite oxide according to the second example may have a crystal structure belonging to the space group Fd-3m.

In a crystal structure belonging to the space group Fd-3m (i.e., a spinel crystal structure), a three-dimensional network constituted by transition metal-anion octahedrons, which serve as pillars, is formed. On the other hand, in a crystal structure belonging to the space group R-3m or the space group C2/m (i.e., a layered structure), a two-dimensional network constituted by transition metal-anion octahedrons, which serve as pillars, is formed. Accordingly, when the second phase has a crystal structure belonging to the space group Fd-3m (i.e., a spinel crystal structure), the crystal structure is less likely to become unstable during charging and discharging and, consequently, discharge capacity may be further increased.

In the case where the first lithium composite oxide is the first lithium composite oxide according to the second example, the integrated intensity ratio $I_{(18°-20°)}/I_{(43°-46°)}$ is a parameter that may be used as a measure of the proportions of the first and second phases present in the first lithium composite oxide. The larger the proportion of the first phase, the lower the integrated intensity ratio $I_{(18°-20°)}/I_{(43°-46°)}$. The larger the proportion of the second phase, the higher the integrated intensity ratio $I_{(18°-20°)}/I_{(43°-46°)}$.

In the case where the integrated intensity ratio $I_{(18°-20°)}/I_{(43°-46°)}$ is lower than 0.05, the proportion of the second phase present in the first lithium composite oxide according to the second example is small. In such a case, the diffusibility of Li may become degraded and battery capacity may be reduced to an insufficient degree.

In the case where the integrated intensity ratio $I_{(18°-20°)}/I_{(43°-46°)}$ is higher than 0.90, the proportion of the first phase present in the first lithium composite oxide according to the second example is small. In such a case, the amount of Li intercalated and deintercalated during charging and discharging may be reduced and, consequently, battery capacity may be reduced to an insufficient degree.

As described above, since the first lithium composite oxide according to the second example includes the first and second phases and has an integrated intensity ratio $I_{(18°-20°)}/I_{(43°-46°)}$ of greater than or equal to 0.05 and less than or equal to 0.90, it is considered that the first lithium composite oxide is capable of intercalating and deintercalating a large amount of Li. Furthermore, it is considered that the diffusibility of Li and the stability of the crystal structure are high. This presumably enables the first lithium composite oxide according to the second example to increase battery capacity.

In order to further increase battery capacity, in the first lithium composite oxide according to the second example, the integrated intensity ratio $I_{(18°-20°)}/I_{(43°-46°)}$ may be greater than or equal to 0.10 and less than or equal to 0.70.

The first lithium composite oxide according to the second example includes a first phase having a crystal structure belonging to the space group Fm-3m and a second phase having a crystal structure belonging to a space group other than the space group Fm-3m (e.g., the space group Fd-3m, the space group R-3m, or the space group C2/m). It is not always easy, in the lithium composite oxide, to perfectly identify the space group and plane index reflected by each of the maximum peaks present in the range of diffraction angle 2θ of greater than or equal to 18° and less than or equal to 20° and the maximum peaks present in the range of diffraction angle 2θ of greater than or equal to 43° and less than or equal to 46°. In order to address the above issue, in addition to the X-ray diffraction measurement described above, an electron diffraction measurement using a transmission electron microscope (hereinafter, abbreviated as "TEM") may be conducted. Observing an electron diffraction pattern by a known method enables the identification of the space groups included in the lithium composite oxide. Whether the first lithium composite oxide according to the second example includes a first phase having a crystal structure belonging to the space group Fm-3m and a second phase having a crystal structure belonging to a space group other than the space group Fm-3m (e.g., the space group Fd-3m, the space group R-3m, or the space group C2/m) may be confirmed in the above-described manner.

In order to further increase battery capacity, the first lithium composite oxide may include, as a transition metal, at least one element selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

In order to further increase battery capacity, the first lithium composite oxide may include, as a transition metal, at least one element selected from the group consisting of Mn, Co, Ni, Fe, Cu, V, Nb, Ti, Cr, Ru, W, B, Si, P, and Al.

In order to further increase battery capacity, the first lithium composite oxide may include, as a transition metal, at least one element selected from the group consisting of Mn, Co, Ni, Fe, Cu, V, Ti, Cr, and Zn (i.e., at least one 3d transition metal element selected from the above 3d transition metal elements).

The first lithium composite oxide may include, as a transition metal, Mn.

Since a Mn-oxygen hybrid orbital is readily formed, the deintercalation of oxygen during charging may be reduced. This presumably stabilizes the crystal structure and enables the intercalation and deintercalation of a further large amount of Li even in the case where the amount of cation mixing is relatively large (e.g., the integrated intensity ratio is greater than or equal to 0.05 and less than or equal to 0.90). Accordingly, battery capacity may be further increased.

The first lithium composite oxide may include at least one element selected from the group consisting of F, Cl, N, and S. At least one element selected from the above elements stabilizes the crystal structure of the first lithium composite oxide. Some of the oxygen atoms included in the first lithium composite oxide may be replaced with electrochemically inactive anions. In other words, some of the oxygen atoms included in the first lithium composite oxide may be replaced with at least one type of anions selected from the group consisting of F, Cl, N, and S. This replacement may further stabilize the crystal structure of the first lithium composite oxide and enable the intercalation and deintercalation of a further large amount of Li. This presumably increases the discharge capacity or operating voltage of the battery and energy density and consequently further increases battery capacity.

The first lithium composite oxide may include F.

Since fluorine atoms have high electronegativity, replacing some of the oxygen atoms with fluorine atoms enhances cation-anion interaction and increases discharge capacity or operation voltage. For the same reasons as described above, moreover, the dissolution of F causes the localization of electrons, compared with the case where the first lithium composite oxide does not include F. This limits the deintercalation of oxygen during charging and stabilizes the crystal structure. It is considered that, even in the case where the amount of cation mixing is relatively large (e.g., the case where the integrated intensity ratio $I_{(18°-20°)}/I_{(43°-46°)}$ is greater than or equal to 0.05 and less than or equal to 0.90), the crystal structure may be stabilized and a further large amount of Li may be intercalated and deintercalated. Since the above-described advantageous effects act in a comprehensive manner, battery capacity may be further increased.

An example of the chemical composition of the first lithium composite oxide is described below.

The average composition of the first lithium composite oxide may be represented by Composition formula (1) below.

$$Li_xMe_yO_\alpha Q_\beta \qquad (1)$$

where,

Me is at least one element selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; and Q is at least one element selected from the group consisting of F, Cl, N, and S.

In Composition formula (1), the following four mathematical formulas may be satisfied:

$$1.05 \leq x \leq 1.4,$$

$$0.6 \leq y \leq 0.95,$$

$$1.2 \leq \alpha \leq 2, \text{ and}$$

$$0 \leq \beta \leq 0.8,$$

The above first lithium composite oxide may further increase battery capacity.

Me may include at least one element selected from the group consisting of Mn, Co, Ni, Fe, Cu, V, Ti, Cr, and Zn. In other words, Me may include at least one 3d transition metal element.

In order to further increase battery capacity and further reduce the voltage drop of the battery, the following two mathematical formulas may be satisfied:

$$1.33 \leq \alpha \leq 2, \text{ and}$$

$$0 \leq \beta \leq 0.67$$

In the case where Me is represented by Chemical formula Me'$_{y1}$Me''$_{y2}$ (where Me' and Me'' each independently represent at least one selected from the above elements for Me), "y=y1+y2" is satisfied. For example, when Me is Mn$_{0.6}$Co$_{0.2}$, "y=0.6+0.2=0.8" is satisfied. Similarly, in the case where Q includes two or more elements, the calculation may be done as in the case for Me.

In Embodiment 1, the "average composition" of the first lithium composite oxide is a composition determined by analyzing the elements included in the first lithium composite oxide without regard to the difference in composition among the phases included in the first lithium composite oxide and typically refers to a composition determined by conducting an element analysis using a sample having a size comparable to or larger than the primary particles of the first lithium composite oxide. The first and second phases included in the first lithium composite oxide according to the second example may have the same chemical composition. The first and second phases may have different chemical compositions.

The above average composition may be determined by inductively coupled plasma atomic emission spectroscopy, inert gas fusion-infrared absorption, ion chromatography, or any combination of the above analysis methods.

When x is greater than or equal to 1.05, the amount of Li that can be intercalated into and deintercalated from the positive electrode active material is large and, accordingly, battery capacity may be increased.

When x is less than or equal to 1.4, the amount of Li intercalated into and deintercalated from the positive electrode active material due to the oxidation reduction reaction of Me is large. This eliminates the need to use a large amount of oxidation reduction reaction of oxygen and consequently stabilizes the crystal structure. As a result, battery capacity may be increased.

When y is greater than or equal to 0.6, the amount of Li intercalated into and deintercalated from the positive electrode active material due to the oxidation reduction reaction of Me is large. This eliminates the need to use a large amount of oxidation reduction reaction of oxygen and consequently stabilizes the crystal structure. As a result, battery capacity may be increased.

When y is less than or equal to 0.95, the amount of Li that can be intercalated into and deintercalated from the positive electrode active material is large and, accordingly, battery capacity may be increased.

When $\alpha$ is greater than or equal to 1.2, a reduction in the amount of charge compensation due to the oxidation and reduction of oxygen may be limited and, consequently, battery capacity may be increased.

When $\alpha$ is less than or equal to 2.0, an excessive increase in capacity due to the oxidation and reduction of oxygen may be prevented and the crystal structure may become stable upon the deintercalation of Li. As a result, battery capacity may be increased.

When $\beta$ is less than or equal to 0.8, an increase in the impact of electrochemical inactivity of Q may be limited and, consequently, electron conductivity may be enhanced. As a result, battery capacity may be increased. When $\beta$ is less than or equal to 0.67, an increase in the impact of electrochemical inactivity of Q may be further limited and, consequently, electron conductivity may be further enhanced. As a result, battery capacity may be further increased.

In order to further increase battery capacity and further reduce the voltage drop of the battery, in Composition formula (1), Me may include at least one element selected from the group consisting of Mn, Co, Ni, Fe, Cu, V, Nb, Ti, Cr, Ru, W, B, Si, P, and Al.

Me may include Mn. In other words, Me may be Mn.

Me may further include, in addition to Mn, at least one element selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

As described above, since Mn is capable of readily combining with oxygen to form a hybrid orbital, the deintercalation of oxygen during charging may be reduced. The crystal structure may be stabilized even in the case where the amount of cation mixing is relatively large (e.g., the integrated intensity ratio $I_{(18°-20°)}/I_{(43°-46°)}$ is greater than or equal to 0.05 and less than or equal to 0.90). Accordingly, battery capacity may be further increased.

The molar ratio of Mn to Me may be greater than or equal to 50%. That is, the molar ratio of Mn to the entirety of Me including Mn (i.e., molar ratio Mn/Me) may be greater than or equal to 0.5 and less than or equal to 1.0.

When the above molar ratio is greater than or equal to 50%, the crystal structure includes a sufficient amount of Mn, which is capable of readily combining with oxygen to form a hybrid orbital, and, consequently, the deintercalation of oxygen during charging may be reduced. The crystal structure may be stabilized even in the case where the amount of cation mixing is relatively large (e.g., the integrated intensity ratio $I_{(18°-20°)}/I_{(43°-46°)}$ is greater than or equal to 0.05 and less than or equal to 0.90). Accordingly, battery capacity may be further increased.

For the same reasons as described above, the above molar ratio may be greater than or equal to 67.5% or greater than or equal to 75%.

Me may include at least one element selected from the group consisting of B, Si, P, and Al such that the molar ratio of the selected element to Me is less than or equal to 20%.

Since B, Si, P, and Al have a high covalent bonding property, they are capable of stabilizing the crystal structure. Consequently, cycle characteristics are enhanced and battery life may be further increased.

In order to further increase battery capacity, the following two mathematical formulas may be satisfied:

$1.1 \leq x \leq 1.2$, and $y=0.8$

In order to further increase battery capacity, the following two mathematical formulas may be satisfied:

$1.1 \leq x \leq 1.25$, and $0.75 \leq y \leq 0.8$

In order to further increase battery capacity, the following two mathematical formulas may be satisfied:

$1.33 \leq \alpha \leq 1.9$, and $0.1 \leq \beta \leq 0.67$

In order to further increase battery capacity, the following two mathematical formulas may be satisfied:

$1.67 \leq \alpha \leq 2$, and $0 \leq \beta \leq 0.33$

In order to further increase battery capacity, the following two mathematical formulas may be satisfied:

$1.67 \leq \alpha < 2$, and $0 < \beta \leq 0.33$

In order to further increase battery capacity, the following two mathematical formulas may be satisfied:

$1.67 \leq \alpha \leq 1.9$, and $0.1 \leq \beta \leq 0.33$

As described above, the compound represented by Composition formula (1) may include Q (i.e., at least one element selected from the group consisting of F, Cl, N, and S).

Some of the oxygen atoms included in the first lithium composite oxide may be replaced with electrochemically inactive anions. In other words, some of the oxygen atoms may be replaced with at least one type of anions selected from the group consisting of F, Cl, N, and S. This replacement may further stabilize the crystal structure of the first lithium composite oxide represented by Composition formula (1). It is considered that replacing some of the oxygen atoms with anions having a larger ionic radius than oxygen anions expands the crystal lattice and enhances the diffusibility of Li. The crystal structure may become stable even in the case where the amount of cation mixing is relatively large (e.g., the case where the integrated intensity ratio $I_{(18°-20°)}/I_{(43°-46°)}$ is greater than or equal to 0.05 and less than or equal to 0.90) as described above. Battery capacity may be increased in the above-described manner.

Q may include F. That is, Q may be F.

Q may further include, in addition to F, at least one element selected from the group consisting of Cl, N, and S.

Since fluorine atoms have high electronegativity, replacing some of the oxygen atoms with fluorine atoms enhances cation-anion interaction and increases discharge capacity or operation voltage. For the same reasons as described above, moreover, the dissolution of F causes the localization of electrons, compared with the case where the first lithium composite oxide does not include F. This limits the deintercalation of oxygen during charging and stabilizes the crystal structure. The crystal structure may be stabilized even in the case where the amount of cation mixing is relatively large (e.g., the case where the integrated intensity ratio $I_{(18°-20°)}/I_{(43°-46°)}$ is greater than or equal to 0.05 and less than or equal to 0.90) as described above. Since the above-described advantageous effects act in a comprehensive manner, battery capacity may be further increased.

The following two mathematical formulas may be satisfied:

$1.33 \leq \alpha \leq 1.67$, and $0.33 \leq \beta \leq 0.67$

When the above two mathematical formulas are satisfied, an excessive increase in capacity due to the oxidation and reduction of oxygen may be prevented. In such a case, the impact of electrochemical inactivity of Q may be produced to a sufficient degree and, consequently, the crystal structure may remain stable even upon the deintercalation of Li. Battery capacity may be increased in the above-described manner.

The molar ratio of Li to Me is represented by mathematical formula (x/y).

In order to further increase battery capacity, the molar ratio (x/y) may be greater than or equal to 1.3 and less than or equal to 1.9.

When the molar ratio (x/y) is more than 1, the proportion of the number of Li atoms included in the first lithium composite oxide is higher than the proportion of the number of Li atoms included in the positive electrode active materials used in the related art which is represented by, for example, composition formula $LiMnO_2$. Therefore, in such a case, a further large amount of Li may be intercalated and deintercalated.

When the molar ratio (x/y) is greater than or equal to 1.3, a large amount of Li can be used and, consequently, Li diffusion paths may be formed in an appropriate manner. Therefore, when the molar ratio (x/y) is greater than or equal to 1.3, battery capacity may be further increased.

When the molar ratio (x/y) is less than or equal to 1.9, a reduction in the available amount of oxidation reduction reaction of Me may be limited. This eliminates the need to use a large amount of oxidation reduction reaction of oxygen. Moreover, a reduction in the Li intercalation efficiency during discharging, which occurs as a result of the destabilization of crystal structure upon the deintercalation of Li during charging, may be limited. This further increases battery capacity.

In order to further increase battery capacity, the molar ratio (x/y) may be greater than or equal to 1.38 and less than or equal to 1.67.

In order to further increase battery capacity, the molar ratio (x/y) may be greater than or equal to 1.38 and less than or equal to 1.5.

The molar ratio of O to Q is represented by mathematical formula ($\alpha/\beta$).

In order to further increase battery capacity, the molar ratio ($\alpha/\beta$) may be greater than or equal to 2 and less than or equal to 19.

In order to further increase battery capacity, the molar ratio ($\alpha/\beta$) may be greater than or equal to 5 and less than or equal to 19.

When the molar ratio ($\alpha/\beta$) is greater than or equal to 2, a reduction in the amount of charge compensation due to the oxidation and reduction of oxygen may be limited. In addition, the impact of electrochemical inactivity of Q may be reduced and, consequently, electron conductivity may be enhanced. This may further increase battery capacity.

When the molar ratio ($\alpha/\beta$) is greater than or equal to 5, a reduction in the amount of charge compensation due to the oxidation and reduction of oxygen may be further limited. In addition, the impact of electrochemical inactivity of Q may be further reduced and, consequently, electron conductivity may be further enhanced. This may even further increase battery capacity.

When the molar ratio ($\alpha/\beta$) is less than or equal to 19, an excessive increase in capacity due to the oxidation and reduction of oxygen may be prevented. This stabilizes the crystal structure upon the deintercalation of Li. Moreover, the impact of electrochemical inactivity of Q may be produced and, consequently, the crystal structure may become stable upon the deintercalation of Li. This enables the production of a battery having a further large capacity.

In order to further increase battery capacity, the molar ratio ($\alpha/\beta$) may be greater than or equal to 2 and less than or equal to 5.

As described above, in Embodiment 1, the first lithium composite oxide may have an average composition represented by composition formula $Li_xMe_yO_\alpha Q_\beta$. Thus, the first lithium composite oxide is constituted by a cation portion and an anion portion. The cation portion is constituted by Li and Me, while the anion portion is constituted by O and Q. The molar ratio of the cation portion constituted by Li and Me to the anion portion constituted by O and Q is represented by mathematical formula $((x+y)/(\alpha+\beta))$.

In order to further increase battery capacity, the molar ratio $((x+y)/(\alpha+\beta))$ may be greater than or equal to 0.75 and less than or equal to 1.2.

When the molar ratio $((x+y)/(\alpha+\beta))$ is greater than or equal to 0.75, the production of a large amount of impurities in the synthesis of the first lithium composite oxide may be prevented and, consequently, battery capacity may be further increased.

When the molar ratio $((x+y)/(\alpha+\beta))$ is less than or equal to 1.2, the loss of the anion portion of the first lithium composite oxide may be small and, consequently, the crystal structure may remain stable even after the deintercalation of lithium from the first lithium composite oxide during charging. This may further increase battery capacity.

In order to further increase battery capacity and enhance cycle characteristics, the molar ratio $((x+y)/(\alpha+\beta))$ may be greater than or equal to 0.95 and less than or equal to 1.0.

When the molar ratio $((x+y)/(\alpha+\beta))$ is less than or equal to 1.0, the loss of cations occurs in the crystal structure. In such a case, a larger number of Li diffusion paths may be formed and, consequently, battery capacity may be further increased. Furthermore, since the loss of cations is randomly arranged in the crystal structure in the initial state, the crystal structure does not become unstable even after the deintercalation of Li. This enables the production of a long-life battery having excellent cycle characteristics.

Some of the Li atoms included in the first lithium composite oxide may be replaced with alkali metal atoms, such as Na atoms or K atoms.

As described above, in Embodiment 1, the lithium composite oxide may include a second lithium composite oxide that covers at least a part of the surface of the first lithium composite oxide and has a crystal structure belonging to the space group Fd-3m. In the case where a common positive electrode active material is used at high potentials, the decomposition (e.g., side reaction) of an electrolyte is facilitated and a transition metal may become eluted from the surface of the positive electrode active material. In the case where a common positive electrode active material is used at high potentials, furthermore, anionic species included in the positive electrode active material may become deintercalated as a gas. This may result in the dislocation of the crystal structure of the positive electrode active material and a reduction in the operating voltage. The second lithium composite oxide has a crystal structure belonging to the space group Fd-3m. A phase having a crystal structure belonging to the space group Fd-3m is resistant to structure destabilization which may occur during charging and discharging. Thus, in Embodiment 1, since the lithium composite oxide includes the second lithium composite oxide deposited on at least a part of the surface thereof, the dislocation of the crystal structure of the positive electrode active material may be reduced. Consequently, a battery having a low average operating voltage drop may be produced using the positive electrode active material according to Embodiment 1.

In Embodiment 1, the integrated intensity ratio $I_{(63°-65°)}/I_{(17°-19°)}$ is greater than or equal to 0.8 and less than or equal to 2.0. The integrated intensity ratio $I_{(63°-65°)}/I_{(17°-19°)}$ may be used also as a measure of the presence of the second lithium composite oxide having a crystal structure belonging to the space group Fd-3m.

The integrated intensity ratio $I_{(63°-65°)}/I_{(17°-19°)}$ may be greater than or equal to 1.3 and less than or equal to 1.6.

When the integrated intensity ratio $I_{(63°-65°)}/I_{(17°-19°)}$ is greater than or equal to 1.3 and less than or equal to 1.6, the reduction in the dislocation of the crystal structure of the positive electrode active material which is caused by the second lithium composite oxide may be enhanced and, consequently, a battery having a further low voltage drop may be provided.

The second lithium composite oxide may be mixed with at least a part of the surface of the first lithium composite oxide to form a solid solution.

In the case where a solid solution is formed, the elution (e.g., deintercalation) of the metal elements may be further reduced and, consequently, the cycle characteristics of the battery may be further enhanced.

In order to increase battery capacity and reduce the voltage drop, the molar ratio of the second lithium composite oxide to the first lithium composite oxide in the positive electrode active material according to Embodiment 1 may be less than or equal to 50%.

In order to increase battery capacity and reduce the voltage drop, the molar ratio of the second lithium composite oxide to the first lithium composite oxide in the positive electrode active material according to Embodiment 1 may be greater than or equal to 6% and less than or equal to 29%.

In order to increase battery capacity and reduce the voltage drop, the molar ratio of the second lithium composite oxide to the first lithium composite oxide in the positive electrode active material according to Embodiment 1 may be greater than or equal to 18% and less than or equal to 25%.

In order to increase battery capacity and reduce the voltage drop, the second lithium composite oxide may have a thickness of greater than or equal to 0.1 nanometers and less than or equal to 30 nanometers.

In order to increase battery capacity and reduce the voltage drop, the second lithium composite oxide may have a thickness of greater than or equal to 0.5 nanometers and less than or equal to 6 nanometers.

In order to increase battery capacity and reduce the voltage drop, the second lithium composite oxide may have a thickness of greater than or equal to 2 nanometers and less than or equal to 3 nanometers.

The second lithium composite oxide may be a known lithium composite oxide having a spinel crystal structure. The second lithium composite oxide may be, for example, a lithium manganese composite oxide (i.e., lithium manganese oxide). Examples of the lithium manganese composite oxide having a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$. The lithium manganese composite oxide may be mixed with a small amount of lithium nickel oxide (e.g., $LiNiO_2$ or $LiNi_{1-x}M_xO_2$ (0<x<1; M is Co or Al)). This may limit the elution of manganese and the decomposition of an electrolyte solution.

The second lithium composite oxide may be represented by Composition formula (2) below.

$$Li_aA_bO_c \qquad (2)$$

where

A is at least one element selected from the group consisting of Ni, Co, Mn, Nb, Si, Al, P, S, Ti, V, Cr, Fe, Cu, Zn, Ga, Zr, Nb, Mo, Ru, Ta, and W; and the following three mathematical formulas are satisfied:

$0<a\le 2$, $1.8\le b\le 2.2$, and $3.5\le c\le 4.5$

The positive electrode active material according to Embodiment 1 may include the first and second lithium composite oxides as main components. In other words, the positive electrode active material according to Embodiment 1 may include the first and second lithium composite oxides such that the mass ratio of the first and second lithium composite oxides to the entire positive electrode active material is greater than or equal to 50%. Such a positive electrode active material may further increase battery capacity.

In order to further increase battery capacity, the above mass ratio may be greater than or equal to 70%.

In order to further increase battery capacity, the above mass ratio may be greater than or equal to 90%.

The positive electrode active material according to Embodiment 1 may further include, in addition to the first and second lithium composite oxides, inevitable impurities.

The positive electrode active material according to Embodiment 1 may include starting materials thereof as unreacted substances. The positive electrode active material according to Embodiment 1 may include a by-product of the synthesis of the first and second lithium composite oxides. The positive electrode active material according to Embodiment 1 may include a decomposition product produced by the decomposition of the first and second lithium composite oxides.

The positive electrode active material according to Embodiment 1 may include only the first and second lithium composite oxides, except inevitable impurities.

A positive electrode active material including only the first and second lithium composite oxides may further increase battery capacity and enhance cycle characteristics.

Method for Producing Positive Electrode Active Material

A first example of the method for producing the positive electrode active material according to Embodiment 1 is described below. In the first example, the positive electrode active material includes only the lithium composite oxide and the lithium composite oxide includes the first and second lithium composite oxides.

First, a precursor of the first lithium composite oxide is prepared. The precursor of the first lithium composite oxide may be prepared by, for example, the method described below.

A raw material containing Li and a raw material containing Me are prepared. In the case where the first lithium composite oxide includes Q, furthermore, a raw material containing Q is prepared.

Examples of the raw material containing Li include a lithium oxide, such as $Li_2O$ or $Li_2O_2$; a lithium salt, such as LiF, $Li_2CO_3$, or LiOH; and a lithium composite oxide, such as $LiMeO_2$ or $LiMe_2O_4$.

Examples of the raw material containing Me include a metal oxide, such as $Me_2O_3$; a metal salt, such as $MeCO_3$ or $Me(NO_3)_2$; a metal hydroxide, such as $Me(OH)_2$ or MeOOH; and a lithium composite oxide, such as $LiMeO_2$ or $LiMe_2O_4$.

For example, in the case where Me is Mn, examples of a raw material containing Mn include a manganese oxide, such as $MnO_2$ or $Mn_2O_3$; a manganese salt, such as $MnCO_3$ or $Mn(NO_3)_2$; a manganese hydroxide, such as $Mn(OH)_2$ or MnOOH; and a lithium manganese composite oxide, such as $LiMnO_2$ or $LiMn_2O_4$.

Examples of the raw material containing Q include a halogenated lithium, a transition metal halide, a transition metal sulfide, and a transition metal nitride.

In the case where Q is F, examples of a raw material containing F include LiF and a transition metal fluoride.

The above raw materials are prepared such that the molar ratio represented by Composition formula (1) is satisfied. In this manner, x, y, a, and may be changed within the ranges represented by Composition formula (1). The raw materials prepared are mixed with one another by, for example, dry process or wet process and subsequently mechanochemically reacted with one another in a mixing apparatus, such as a planetary ball mill, for 10 hours or more. Hereby, a precursor of the first lithium composite oxide is prepared.

The precursor of the first lithium composite oxide is subsequently subjected to a heat treatment, which causes a part of the atoms to be regularly arranged and enables the production of a bulk first lithium composite oxide.

The conditions under which the heat treatment is conducted are set appropriately such that the first lithium composite oxide can be produced. The optimal conditions for the heat treatment vary by the conditions other than the heat treatment conditions and the composition that is to be achieved. The inventors of the present invention found that, the higher the temperature at which the heat treatment is conducted and the larger the amount of time during which the heat treatment is conducted, the smaller the amount of cation mixing that occurs in the first lithium composite oxide. Thus, a manufacturer may determine the heat treatment conditions in accordance with the tendency. The heat treatment temperature and time may be selected from, for example, 300° C. to 600° C. and 30 minutes to 1 hour, respectively. Examples of the atmosphere in which the heat treatment is conducted include an air atmosphere, an oxygen atmosphere, and an inert atmosphere (e.g., a nitrogen atmosphere or an argon atmosphere).

The first lithium composite oxide may be produced by adjusting the raw materials, the conditions under which the raw materials are mixed, and the heat treatment conditions as described above.

Using a lithium transition metal composite oxide as a raw material may reduce the amount of energy required by element mixing. This increases the purity of the first lithium composite oxide.

The first lithium composite oxide is dispersed in, for example, a solution used for the preparation of the second lithium composite oxide (hereinafter, this solution is referred to simply as "coating solution"). The resulting dispersion liquid is stirred. Hereby, a precursor of the positive electrode active material, which includes the first lithium composite oxide and a precursor of the second lithium composite oxide which is deposited on the surface of the first lithium composite oxide, is prepared. The amount of time during which stirring is performed may be, for example, 10 minutes to 1 hour. The concentration of the raw material for the second lithium composite oxide in the coating solution is, for example, 0.0001 to 1 mol/L or may be 0.001 to 0.1 mol/L. Examples of the above raw material include manganese acetate tetrahydrate. The coating solution may be an aqueous solution.

In the case where the second lithium composite oxide is represented by Composition formula (2), the coating solution includes, for example, a raw material containing the element A. Examples of the raw material containing the element A include an oxide, such as $A_2O_3$; a salt of A, such as $A(CH_3COO)_2$, $ACO_3$, or $A(NO_3)_2$; a hydroxide, such as $A(OH)_2$ or AOOH; and a lithium composite oxide, such as $LiAO_2$ or $LiA_2O_4$. Examples of a solvent included in the coating solution include water, ethanol, and acetone.

For example, in the case where A is Mn, examples of a raw material containing Mn include a manganese oxide, such as $MnO_2$ or $Mn_2O_3$; a manganese salt, such as $Mn(CH_3COO)_2$, $MnCO_3$, $Mn(NO_3)_2$; a manganese hydroxide, such as $Mn(OH)_2$ or MnOOH; and a lithium manganese composite oxide, such as $LiMnO_2$ or $LiMn_2O_4$.

Subsequently, the precursor of the positive electrode active material is subjected to a heat treatment, which causes the precursor of the second lithium composite oxide to react with, for example, lithium deposited on the surface of the first lithium composite oxide to form a second lithium composite oxide having a spinel crystal structure.

The conditions under which the heat treatment is conducted may be set appropriately such that the second lithium composite oxide is produced. The optimal conditions for the heat treatment vary by the conditions other than the heat treatment conditions and the composition that is to be achieved. The heat treatment temperature and time may be selected from, for example, 300° C. to 900° C. and 10 minutes to 6 hours, respectively. The heat treatment temperature may be greater than or equal to 600° C. or greater than or equal to 700° C. Examples of the atmosphere in which the heat treatment is conducted include an air atmosphere, an oxygen atmosphere, and an inert atmosphere (e.g., a nitrogen atmosphere or an argon atmosphere).

The second lithium composite oxide is formed on at least a part of the surface of the first lithium composite oxide by adjusting the raw materials, the conditions under which the raw materials are mixed, and the heat treatment conditions as described above. The positive electrode active material according to Embodiment 1 may be produced in the above-described manner.

A second example of the method for producing the positive electrode active material according to Embodiment 1 is described below. In the second example, a precursor of the second lithium composite oxide is deposited on the surface of a precursor of the first lithium composite oxide which has not been subjected to a heat treatment, and both of the precursors of the first and second lithium composite oxides are subjected to a heat treatment simultaneously. Specifically, a precursor of the first lithium composite oxide is prepared as in the method of the first example, the precursor is dispersed in, for example, the coating solution, and the resulting dispersion liquid is stirred. Hereby, a precursor of the positive electrode active material which includes a precursor of the first lithium composite oxide and a precursor of the second lithium composite oxide which is deposited on the surface of the precursor of the first lithium composite oxide is prepared. The coating solution used in the second example, the amount of time during which stirring is performed in the second example, and the heat treatment conditions used in the second example may be the same as those in the first example.

The compositions of the first and second lithium composite oxides may be determined by ICP atomic emission spectroscopy, inert gas fusion-infrared absorption, ion chromatography, or any combination of the above analysis methods.

The space groups of the crystal structures included in the first and second lithium composite oxides may be determined by powder X-ray analysis of the positive electrode active material.

In addition to the above X-ray diffraction measurement, an electron diffraction measurement may be conducted using a transmission electron microscope (hereinafter, abbreviated as "TEM"). The space groups included in the first and second lithium composite oxides can be identified by observing an electron diffraction pattern by a known method. Whether the first and second lithium composite oxides have a crystal structure belonging to the space group Fd-3m may be confirmed in the above-described manner.

As described above, the first example of the method for producing the positive electrode active material according to Embodiment 1 includes a step (a) of preparing raw materials; a step (b) of conducting a mechanochemical reaction of the raw materials to produce a precursor of the first lithium composite oxide; a step (c) of subjecting the precursor of the first lithium composite oxide to a heat treatment to produce a bulk first lithium composite oxide; a step (d) of forming a precursor of the second lithium composite oxide on at least a part of the surface of the first lithium composite oxide; and a step (e) of subjecting the precursor of the second lithium composite oxide to a heat treatment to produce a positive electrode active material.

The second example of the method for producing the positive electrode active material according to Embodiment 1 includes a step (a) of preparing the raw materials; a step (b) of conducting a mechanochemical reaction of the raw materials to produce a precursor of a bulk first lithium composite oxide; a step (c) of forming a precursor of the second lithium composite oxide on at least a part of the surface of the precursor of the first lithium composite oxide; and a step (d) of subjecting the precursors of the first and second lithium composite oxides to a heat treatment to produce a positive electrode active material.

The raw material may be a mixed raw material. In the mixed raw material, the ratio of Li to Me may be greater than or equal to 1.3 and less than or equal to 1.9.

A lithium compound used as a raw material may be prepared by a known method.

The raw material may be a mixed raw material. In the mixed raw material, the ratio of Li to Me may be greater than or equal to 1.38 and less than or equal to 1.67.

The ratio of Li to Me may be greater than or equal to 1.38 and less than or equal to 1.5.

In the step (b), the mechanochemical reaction of the raw materials may be conducted using a ball mill.

As described above, the first lithium composite oxide may be synthesized by conducting a mechanochemical reaction of the precursor (e.g., LiF, $Li_2O$, a transition metal oxide, or a lithium transition metal composite oxide) with a planetary ball mill.

In the step (d) of the first example, the first lithium composite oxide may be dispersed in the coating solution and the precursor of the second lithium composite oxide may be formed on at least a part of the surface of the first lithium composite oxide. In the step (c) of the second example, the precursor of the first lithium composite oxide may be dispersed in the coating solution and the precursor of the second lithium composite oxide may be formed on at least a part of the surface of the precursor of the first lithium composite oxide.

In the case where a positive electrode active material including a component other than the first or second lithium composite oxide is produced, the above production method may further include a step of mixing the synthesis product obtained by the heat treatment of the precursor with the other component subsequent to the step (e) of the first example or the step (d) of the second example. In the case where a positive electrode active material including only the first and second lithium composite oxides is produced, the synthesis product obtained by conducting the heat treatment of the precursor in the step (e) of the first example or the step (d) of the second example may be directly used as a positive electrode active material.

Embodiment 2

Embodiment 2 is described below. The items described in Embodiment 1 may be omitted as needed.

A battery according to Embodiment 2 includes a positive electrode including the positive electrode active material according to Embodiment 1, a negative electrode, and an electrolyte.

The battery according to Embodiment 2 has a large capacity.

The positive electrode included in the battery according to Embodiment 2 may include a positive electrode active material layer. The positive electrode active material layer may include the positive electrode active material according to Embodiment 1 as a main component. In other words, the mass ratio of the positive electrode active material to the entire positive electrode active material layer may be greater than or equal to 50%.

Such a positive electrode active material layer may further increase battery capacity.

The above mass ratio may be greater than or equal to 70%.

Such a positive electrode active material layer may further increase battery capacity.

The above mass ratio may be greater than or equal to 90%.

Such a positive electrode active material layer may further increase battery capacity.

The battery according to Embodiment 2 may be, for example, a lithium-ion secondary battery, a nonaqueous electrolyte secondary battery, or a solid-state battery.

The negative electrode included in the battery according to Embodiment 2 may include a negative electrode active material capable of occluding and releasing lithium ions. Alternatively, the negative electrode may include a material that allows lithium metal to dissolve from the material into the electrolyte during discharging and to precipitate on the material during charging.

The electrolyte included in the battery according to Embodiment 2 may be a nonaqueous electrolyte (e.g., a nonaqueous electrolyte solution).

The electrolyte included in the battery according to Embodiment 2 may be a solid electrolyte.

FIG. 1 is a cross-sectional view of a battery 10 according to Embodiment 2.

As illustrated in FIG. 1, the battery 10 includes a positive electrode 21, a negative electrode 22, a separator 14, a casing 11, a sealing plate 15, and a gasket 18.

The separator 14 is interposed between the positive electrode 21 and the negative electrode 22.

The positive electrode 21, the negative electrode 22, and the separator 14 are impregnated with, for example, a nonaqueous electrolyte (e.g., a nonaqueous electrolyte solution).

The positive electrode 21, the negative electrode 22, and the separator 14 form an electrode group.

The electrode group is housed in the casing 11.

The casing 11 is sealed with the gasket 18 and the sealing plate 15.

The positive electrode 21 includes a positive electrode current collector 12 and a positive electrode active material layer 13 disposed on the positive electrode current collector 12.

The positive electrode current collector 12 is composed of, for example, a metal material (e.g., at least one selected from the group consisting of aluminum, stainless steel, nickel, iron, titanium, copper, palladium, gold, and platinum or an alloy thereof).

The positive electrode current collector 12 may be omitted. In such a case, the casing 11 is used as a positive electrode current collector.

The positive electrode active material layer 13 includes the positive electrode active material according to Embodiment 1.

The positive electrode active material layer 13 may optionally include, for example, an additive (e.g., a conductant agent, an ion conduction agent, or a binding agent) as needed.

The negative electrode 22 includes a negative electrode current collector 16 and a negative electrode active material layer 17 disposed on the negative electrode current collector 16.

The negative electrode current collector 16 is composed of, for example, a metal material (e.g., at least one selected from the group consisting of aluminum, stainless steel, nickel, iron, titanium, copper, palladium, gold, and platinum or an alloy thereof).

The negative electrode current collector 16 may be omitted. In such a case, the sealing plate 15 is used as a negative electrode current collector.

The negative electrode active material layer 17 includes a negative electrode active material.

The negative electrode active material layer 17 may optionally include, for example, an additive (e.g., a conductant agent, an ion conduction agent, or a binding agent) as needed.

Examples of the negative electrode active material include a metal material, a carbon material, an oxide, a nitride, a tin compound, and a silicon compound.

The metal material may be an elemental metal or an alloy. Examples of the metal material include lithium metal and a lithium alloy.

Examples of the carbon material include natural graphite, coke, graphitizing carbon, carbon fibers, spherical carbon, artificial graphite, and amorphous carbon.

From the viewpoint of capacity density, silicon (Si), tin (Sn), a silicon compound, and a tin compound may be used as a negative electrode active material. The silicon compound and the tin compound may be either an alloy or a solid solution.

Examples of the silicon compound include $SiO_x$ (where $0.05<x<1.95$). A compound obtained by replacing some of the silicon atoms included in $SiO_x$ with atoms of another element may also be used; this compound is an alloy or a solid solution. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (where $0<x<2$), $SnO_2$, and $SnSiO_3$. One tin compound selected from the above tin compounds may be used alone. Two or more tin compounds selected from the above tin compounds may be used in combination.

The shape of the negative electrode active material is not limited. A negative electrode active material having a known shape (e.g., particulate or fibrous) may be used.

The method for charging lithium into the negative electrode active material layer 17 (i.e., causing the negative electrode active material layer 17 to occlude lithium) is not limited. Specific examples of the above method include (a) a method in which lithium is deposited on the negative electrode active material layer 17 by a gas-phase method, such as vacuum vapor deposition; and (b) a method in which a lithium metal foil and the negative electrode active material layer 17 are heated while they are brought into contact with each other. In either of the above methods, lithium is diffused into the negative electrode active material layer 17 by heat. Alternatively, a method in which lithium is electrochemically occluded into the negative electrode active material layer 17 may also be used. Specifically, a battery is prepared using a negative electrode 22 that does not contain lithium and a lithium metal foil (negative electrode). The battery is subsequently charged in order to cause the negative electrode 22 to occlude lithium.

Examples of the binding agent included in the positive electrode 21 and the negative electrode 22 include polyvinylidene fluoride, polytetrafluoroethylene, polyethylene, polypropylene, an aramid resin, polyamide, polyimide, polyamide imide, polyacrylonitrile, polyacrylic acid, a polymethyl acrylate ester, a polyethyl acrylate ester, a hexyl polyacrylate ester, polymethacrylic acid, a polymethyl methacrylate ester, a polyethyl methacrylate ester, a polyhexyl methacrylate ester, polyvinyl acetate, polyvinylpyrrolidone, polyether, polyethersulfone, hexafluoropolypropylene, a styrene butadiene rubber, and carboxymethyl cellulose.

Examples of the binding agent further include copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, a fluoromethyl vinyl ether, acrylic acid, and hexadiene. Alternatively, a mixture of two or more binding agents selected from the above materials may be used.

Examples of the conductant agent included in the positive electrode 21 and the negative electrode 22 include graphite, carbon black, conductive fibers, graphite fluoride, a metal powder, conductive whiskers, a conductive metal oxide, and an organic conductive material.

Examples of the graphite include natural graphite and artificial graphite.

Examples of the carbon black include acetylene black, Ketjenblack, channel black, furnace black, lamp black, and thermal black.

Examples of the metal powder include an aluminum powder.

Examples of the conductive whiskers include zinc oxide whiskers and potassium titanate whiskers.

Examples of the conductive metal oxide include titanium oxide.

Examples of the organic conductive material include phenylene derivatives.

At least a part of the surface of the binding agent may be covered with the conductant agent. For example, the surface of the binding agent may be covered with carbon black. In such a case, battery capacity may be increased.

The material constituting the separator 14 is a material having high ionic permeability and a sufficiently high mechanical strength. Examples of the material constituting the separator 14 include a microporous thin-film, a woven fabric, and a nonwoven fabric. Specifically, it is desirable that the separator 14 be made of a polyolefin, such as polypropylene or polyethylene. A separator 14 made of a polyolefin has excellent durability and produces a shutdown function when the temperature is increased to an excessive degree. The thickness of the separator 14 is, for example, 10 to 300 µm (or 10 to 40 µm). The separator 14 may be a single-layer film composed of only one material. Alternatively, the separator 14 may be a composite film (i.e., multilayer film) composed of two or more materials. The porosity of the separator 14 is, for example, 30% to 70% (or 35% to 60%). The term "porosity" used herein refers to the ratio of the volume of pores to the total volume of the separator 14. Porosity may be measured by a mercury penetration method or the like.

The nonaqueous electrolyte solution include a nonaqueous solvent and a lithium salt dissolved in the nonaqueous solvent.

Examples of the nonaqueous solvent include a cyclic carbonate ester solvent, a chain carbonate ester solvent, a cyclic ether solvent, a chain ether solvent, a cyclic ester solvent, a chain ester solvent, and a fluorine solvent.

Examples of the cyclic carbonate ester solvent include ethylene carbonate, propylene carbonate, and butylene carbonate.

Examples of the chain carbonate ester solvent include dimethyl carbonate, ethyl methyl carbonate, and diethyl carbonate.

Examples of the cyclic ether solvent include tetrahydrofuran, 1,4-dioxane, and 1,3-dioxolane.

Examples of the chain ether solvent include 1,2-dimethoxyethane and 1,2-diethoxyethane.

Examples of the cyclic ester solvent include γ-butyrolactone.

Examples of the chain ester solvent include methyl acetate.

Examples of the fluorine solvent include fluoroethylene carbonate, methyl fluoropropionate, fluorobenzene, fluoroethyl methyl carbonate, and fluorodimethylene carbonate.

One nonaqueous solvent selected from the above materials may be used alone as a nonaqueous solvent. Alternatively, two or more nonaqueous solvents selected from the above materials may be used in combination as a nonaqueous solvent.

The nonaqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate.

When the nonaqueous electrolyte solution includes at least one fluorine solvent selected from the above materials, the oxidation resistance of the nonaqueous electrolyte solution may be enhanced.

As a result, the battery 10 can be operated with stability even in the case where the battery 10 is charged at a high voltage.

The electrolyte included in the battery according to Embodiment 2 may be a solid electrolyte.

Examples of the solid electrolyte include an organic polymer solid electrolyte, an oxide solid electrolyte, and a sulfide solid electrolyte.

Examples of the organic polymer solid electrolyte include a compound produced from a high-molecular-weight compound and a lithium salt. Examples of such a compound include lithium polystyrene sulfonate.

The high-molecular-weight compound may have an ethylene oxide structure. When the high-molecular-weight compound has an ethylene oxide structure, the content of the lithium salt can be increased. This further increases ionic conductivity.

Examples of the oxide solid electrolyte include:
(i) a NASICON solid electrolyte, such as $LiTi_2(PO_4)_3$ or a substitution product thereof;
(ii) a perovskite solid electrolyte, such as $(LaLi)TiO_3$;
(iii) a LISICON solid electrolyte, such as $Li_{14}ZnGe_4O_{16}$, $Li_4SiO_4$, $LiGeO_4$, or a substitution product thereof;
(iv) a garnet solid electrolyte, such as $Li_7La_3Zr_2O_{12}$ or a substitution product thereof;
(v) $Li_3N$ or a H-substitution product thereof; and
(vi) $Li_3PO_4$ or an N-substitution product thereof.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (where X is F, Cl, Br, or I), $MO_y$, or $Li_xMO_y$ (where M is any of P, Si, Ge, B, Al, Ga, and In, and x and y each independently represent a natural number) may be added to the sulfide solid electrolyte.

Among these, a sulfide solid electrolyte is rich in terms of formability and has high ionic conductivity. Accordingly, using a sulfide solid electrolyte as a solid electrolyte may further increase the energy density of the battery.

Among the above sulfide solid electrolytes, $Li_2S$—$P_2S_5$ has high electrochemical stability and a high ionic conductivity. Accordingly, using $Li_2S$—$P_2S_5$ as a solid electrolyte may further increase the energy density of the battery.

A solid electrolyte layer that includes the solid electrolyte may further include the above nonaqueous electrolyte solution.

Since the solid electrolyte layer includes the nonaqueous electrolyte solution, the migration of lithium ions between the active materials and the solid electrolyte may be facilitated. This may further increase the energy density of the battery.

The solid electrolyte layer may include a gel electrolyte or an ionic liquid.

Examples of the gel electrolyte include a polymer material impregnated with the nonaqueous electrolyte solution. Examples of the polymer material include polyethylene oxide, polyacrylonitrile, polyvinylidene fluoride, and polymethyl methacrylate. Examples of the polymer material further include a polymer including an ethylene oxide bond.

Examples of the cation included in the ionic liquid include
(i) a cation of an aliphatic chain quaternary ammonium salt, such as tetraalkylammonium;
(ii) a cation of an aliphatic chain quaternary phosphonium salt, such as tetraalkylphosphonium;
(iii) an aliphatic cyclic ammonium, such as pyrrolidinium, morpholinium, imidazolinium, tetrahydropyrimidinium, piperazinium, or piperidinium; and (iv) a nitrogen-containing heterocyclic aromatic cation, such as pyridinium or imidazolium.

The anion constituting the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the above materials may be used alone as a lithium salt. Alternatively, a mixture of two or more lithium salts selected from the above materials may be used as a lithium salt. The concentration of the lithium salt is, for example, 0.5 to 2 mol/liter.

As for the shape of the battery according to Embodiment 2, the battery is a coin-shaped battery, a cylindrical battery, a rectangular battery, a sheet-shaped battery, a button-shaped battery (i.e., "button cell"), a flattened battery, or a layered battery.

EXAMPLES

Example 1

Preparation of Positive Electrode Active Material

A mixture of LiF, $Li_2MnO_3$, and $LiMnO_2$ was prepared such that the mixture had a Li/Mn/O/F molar ratio of 1.2/0.8/1.67/0.33.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor of a first lithium composite oxide.

The above precursor was subjected to a heat treatment at 700° C. for 1 hour in an air atmosphere. Hereby, a bulk first lithium composite oxide was prepared.

The first lithium composite oxide was subjected to a powder X-ray diffraction measurement. The results of the measurement confirmed that the space group of the first lithium composite oxide was Fd-3m.

The average composition of the first lithium composite oxide which was determined from the molar ratio between the raw materials is represented by $Li_{1.2}Mn_{0.8}O_{1.67}F_{0.33}$ as described in Table 1.

The first lithium composite oxide was dispersed in an aqueous solution of $Mn(CH_3COO)_2 \cdot 4H_2O$. Subsequently, stirring was performed for 30 minutes. The aqueous solution of $Mn(CH_3COO)_2 \cdot 4H_2O$ was the coating solution, that is, an aqueous solution used for preparing a second lithium composite oxide. Hereby, the surface of the first lithium composite oxide was covered with a precursor of the second lithium composite oxide, that is, a precursor of a positive electrode active material was prepared. In other words, a precursor of a positive electrode active material which included the first lithium composite oxide and a precursor of the second lithium composite oxide which was deposited on the surface of the first lithium composite oxide was prepared. The concentration of the manganese acetate in the aqueous solution of $Mn(CH_3COO)_2 \cdot 4H_2O$ was 1 mol/L.

Then, the precursor of the positive electrode active material was subjected to a heat treatment at 700° C. for 20 minutes in an air atmosphere to form a second lithium composite oxide. Hereby, a positive electrode active material of Example 1 was prepared.

Figure 2:
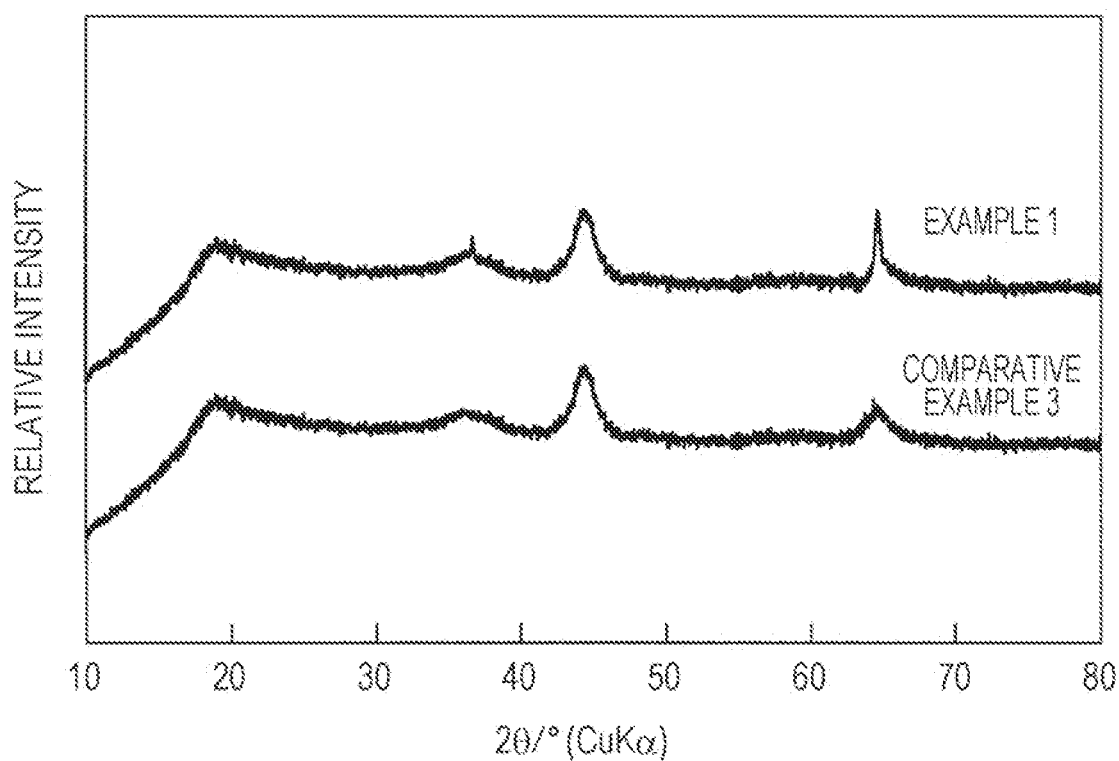
FIG. 2 is a graph illustrating powder X-ray diffraction patterns of the positive electrode active materials prepared in Example 1 and Comparative example 3.

The positive electrode active material prepared in Example 1 was subjected to a powder X-ray diffraction measurement. FIG. 2 is a graph illustrating the results of the powder X-ray diffraction measurement of the positive electrode active material prepared in Example 1. The space groups of the crystal structures of the first and second lithium composite oxides included in the positive electrode active material prepared in Example 1 were identified on the basis of the results of the powder X-ray analysis measurement. The integrated intensity ratios $I_{(18°-20°)}/I_{(43°-46°)}$ and $I_{(63°-65°)}/I_{(17°-19°)}$ of the positive electrode active material prepared in Example 1 were also determined. Table 1 describes the results.

Table 3 describes the molar ratio of the second lithium composite oxide to the first lithium composite oxide and the composition of the second lithium composite oxide. The molar ratio of the second lithium composite oxide to the first lithium composite oxide was calculated on the basis of the volumes estimated from TEM observation images and the crystal structures observed by cross-sectional TEM. The composition of the second lithium composite oxide was identified on the basis of a surface composition analysis, such as X-ray photoelectron spectroscopy.

Preparation of Battery

With 70 parts by mass of the positive electrode active material prepared in Example 1, 20 parts by mass of acetylene black, 10 parts by mass of polyvinylidene fluoride (hereinafter, abbreviated as "PVDF"), and an appropriate amount of N-methyl-2-pyrrolidone (hereinafter, abbreviated as "NMP") were mixed. Hereby, a positive electrode mixture slurry was prepared. The acetylene black served as a conductant agent. The polyvinylidene fluoride served as a binding agent.

The positive electrode mixture slurry was applied onto one of the surfaces of a positive electrode current collector formed of an aluminum foil having a thickness of 20 micrometers.

The positive electrode mixture slurry was dried and then rolled. Hereby, a positive electrode plate including a positive electrode active material layer was prepared.

The positive electrode plate was stamped into a predetermined shape. Hereby, a circular positive electrode having a diameter of 12.5 mm was prepared.

A lithium metal foil having a thickness of 300 micrometers was stamped into a predetermined shape. Hereby, a circular negative electrode having a diameter of 14 mm was prepared.

Fluoroethylene carbonate (hereinafter, abbreviated as "FEC"), ethylene carbonate (hereinafter, abbreviated as "EC"), and ethyl methyl carbonate (hereinafter, abbreviated as "EMC") were mixed with one another at a volume ratio of 1:1:6 to form a nonaqueous solvent.

$LiPF_6$ was dissolved in the nonaqueous solvent at a concentration of 1.0 mol/liter. Hereby, a nonaqueous electrolyte solution was prepared.

A separator was impregnated with the nonaqueous electrolyte solution. The separator was a product of Celgard (Product number: 2320, thickness: 25 micrometers). The separator was a three-layer separator constituted by a polypropylene layer, a polyethylene layer, and a polypropylene layer.

A coin-shaped battery having a diameter of 20 mm and a thickness of 3.2 mm was prepared using the positive electrode, the negative electrode, and the separator in a dry box in which the dew point was kept at −50 degrees Celsius.

Example 2

In Example 2, a positive electrode active material and a coin-shaped battery including the positive electrode active material were prepared as in Example 1, except the item (i) below.

(i) the concentration of $Mn(CH_3COO)_2 \cdot 4H_2O$ in the coating solution was not 1 mol/L but 0.5 mol/L.

Comparative Example 1

In Comparative example 1, a positive electrode active material and a coin-shaped battery including the positive electrode active material were prepared as in Example 1, except the item (ii) below.

(ii) the temperature at which the precursor of the second lithium composite oxide (i.e., the precursor of the positive electrode active material) was subjected to a heat treatment was not 700° C. but 500° C.

Comparative Example 2

In Comparative example 2, a positive electrode active material and a coin-shaped battery including the positive electrode active material were prepared as in Example 1, except the items (i) and (ii) below.

(i) the concentration of $Mn(CH_3COO)_2 \cdot 4H_2O$ in the coating solution was not 1 mol/L but 0.5 mol/L.

(ii) the temperature at which the precursor of the second lithium composite oxide (i.e., the precursor of the positive electrode active material) was subjected to a heat treatment was not 700° C. but 500° C.

Comparative Example 3

In Comparative example 3, a positive electrode active material and a coin-shaped battery including the positive electrode active material were prepared as in Example 1, except that the surface of the first lithium composite oxide was not covered with the second lithium composite oxide. In other words, the positive electrode active material prepared in Comparative example 3 was constituted by only the first lithium composite oxide.

Comparative Example 4

In Comparative example 4, a positive electrode active material represented by $LiMn_2O_4$ (i.e., lithium manganese composite oxide) was prepared by a known method. A coin-shaped battery was prepared using the positive electrode active material as in Example 1.

Battery Evaluations

The battery prepared in Example 1 was charged to a voltage of 4.7 volts at a current density of 0.5 mA/cm$^2$.

Subsequently, the battery prepared in Example 1 was discharged to a voltage of 2.5 volts at a current density of 0.5 mA/cm$^2$.

The initial discharge capacity of the battery prepared in Example 1 was 301 mAh/g.

Then, the battery prepared in Example 1 was charged to a voltage of 4.9 volts at a current density of 0.5 mA/cm$^2$.

Subsequently, the battery prepared in Example 1 was again discharged to a voltage of 2.5 volts at a current density of 0.5 mA/cm$^2$.

The above-described charge-discharge cycle was repeated five times (i.e., five cycles). The drop in the average operating voltage of the battery prepared in Example 1 per charge-discharge cycle was calculated. The drop in average operating voltage was −1.8 millivolts.

The initial discharge capacity of each of the batteries prepared in Example 2 and Comparative examples 1 to 4, the average operating voltage of the battery during the initial discharging, and the drop in the average operating voltage of the battery per charge-discharge cycle were measured as described above.

Tables 1 to 3 describe the results.

As described in Tables 1 to 3, in the batteries prepared in Examples 1 and 2, the average operating voltage was reduced by 1.8 to 2.0 millivolts per charge-discharge cycle. In contrast, in the batteries prepared in Comparative examples 1 to 3, the average operating voltage was reduced by 2.4 to 2.6 millivolts per charge-discharge cycle. The drops in the average operating voltages of the batteries prepared in Examples 1 and 2 were limited compared with the batteries prepared in Comparative examples 1 to 3.

TABLE 1

| | Positive electrode active material | | | | |
|---|---|---|---|---|---|
| | First lithium composite oxide | | Second lithium composite oxide (spinel surface layer) Formation | Integrated intensity ratio $I_{(18°-20°)}/I_{(43°-46°)}$ | Integrated intensity ratio $I_{(63°-65°)}/I_{(17°-19°)}$ |
| | Composition | Space group | | | |
| Example 1 | $Li_{1.2}Mn_{0.8}O_{1.67}F_{0.33}$ | Fd-3m | Yes | 0.7 | 1.6 |
| Example 2 | $Li_{1.2}Mn_{0.8}O_{1.67}F_{0.33}$ | Fd-3m | Yes | 0.7 | 1.3 |
| Comparative example 1 | $Li_{1.2}Mn_{0.8}O_{1.67}F_{0.33}$ | Fd-3m | No | 0.6 | 0.7 |
| Comparative example 2 | $Li_{1.2}Mn_{0.8}O_{1.67}F_{0.33}$ | Fd-3m | No | 0.7 | 0.7 |
| Comparative example 3 | $Li_{1.2}Mn_{0.8}O_{1.67}F_{0.33}$ | Fd-3m | No | 0.6 | 0.7 |
| Comparative example 4 | $LiMn_2O_4$ | Fd-3m | No | 1.2 | — |

TABLE 2

| | Initial discharge capacity (mAh/g) | Average operating voltage drop (mV/cycle) |
|---|---|---|
| Example 1 | 301 | 1.8 |
| Example 2 | 298 | 2.0 |
| Comparative example 1 | 300 | 2.6 |
| Comparative example 2 | 300 | 2.4 |
| Comparative example 3 | 300 | 2.5 |
| Comparative example 4 | 140 | 0.5 |

The lithium composite oxides included in the positive electrode active materials prepared in Examples 1 and 2 had an integrated intensity ratio $I_{(18°-20°)}/I_{(43°-46°)}$ of greater than or equal to 0.05 and less than or equal to 0.90. This means that cation mixing between lithium ions and transition metal cations occurred to a sufficient degree in the lithium composite oxides and, consequently, battery capacities were increased. Furthermore, the lithium composite oxides had an integrated intensity ratio $I_{(63°-65°)}/I_{(17°-19°)}$ of greater than or equal to 0.8 and less than or equal to 2.0. This means that the proportions of a crystal structure belonging to the space group Fd-3m (i.e., a spinel crystal structure) which was present in the lithium composite oxides were sufficiently large. Since the lithium composite oxides had an integrated intensity ratio $I_{(63°-65°)}/I_{(17°-19°)}$ of greater than or equal to 0.8 and less than or equal to 2.0, it is considered that the

TABLE 3

| | Second lithium composite oxide (spinel surface layer) | | | | | | |
|---|---|---|---|---|---|---|---|
| | Formation conditions | | | | | | |
| | $Mn(CH_3CO_2)_2·4H_2O$ Conc.(mol/L) | Heating temperature (Celsius) | Heating time (minute) | Formation | Thickness (nm) | Molar ratio (%) | Average composition |
| Example 1 | 1.0 | 700 | 20 | Yes | 3 | 25 | $LiMn_2O_4$ |
| Example 2 | 0.5 | 700 | 20 | Yes | 2 | 18 | $LiMn_2O_4$ |
| Comparative example 1 | 1.0 | 500 | 20 | No | — | — | — |
| Comparative example 2 | 0.5 | 500 | 20 | No | — | — | — |
| Comparative example 3 | — | — | — | No | — | — | — |
| Comparative example 4 | — | — | — | No | — | — | — | second lithium composite oxide was formed on the surface. The results of TEM observation also confirm the above fact. In a crystal structure belonging to the space group Fd-3m (i.e., a spinel crystal structure), a three-dimensional network constituted by transition metal-anion octahedrons, which serve as pillars, is formed. This presumably enhanced the stability of crystal structure during charging and discharging and limited the drop in average operating voltage.

The drop in the average operating voltage of the battery prepared in Example 1 was further limited compared with the battery prepared in Example 2. This is presumably because, in Example 1, the concentration of $Mn(COOCH_3)_2.4H_2O$ in the coating solution was higher and, accordingly, a crystal structure belonging to the space group Fd-3m (i.e., a spinel crystal structure) was formed at a higher density than in Example 2.

Although the batteries of Comparative examples 1 and 2 were prepared as in Examples 1 and 2 using the aqueous solution of $Mn(CH_3COO)_2.4H_2O$, the batteries prepared in Comparative examples 1 and 2 had an initial discharge capacity and an average operating voltage drop that were substantially equal to those measured in Comparative example 3. This is presumably because the integrated intensity ratios $I_{(63°-65°)}/I_{(17°-19°)}$ of the positive electrode active materials prepared in Comparative examples 1 and 2 which were determined from X-ray diffraction patterns did not fall within the range of greater than or equal to 0.8 and less than or equal to 2.0 and a crystal structure belonging to the space group Fd-3m (i.e., a spinel crystal structure) was not formed. It is considered that the batteries prepared in Comparative examples 1 and 2 had properties similar to those of the battery prepared in Comparative example 3 for the above reasons. One of the possible reasons why a spinel crystal structure was not formed on the surface although a process similar to that conducted in Example 1 was conducted is that the heat treatment temperature was low. Commonly, a crystal structure belonging to the space group Fd-3m (i.e., a spinel crystal structure) is prepared at 700° C. or more. Therefore, it is considered that, in Comparative examples 1 and 2, a crystal structure belonging to the space group Fd-3m was not formed on the surface of the lithium composite oxide due to the heat treatment conditions. It is considered the initial discharge capacity did not change in Comparative examples 1 and 2 (i.e., the batteries prepared in Comparative examples 1 and 2 had initial discharge capacities substantially equal to the initial discharge capacity of the battery prepared in Comparative example 3) since dislocations were not present in the crystal structure.

The average operating voltage of the battery prepared in Comparative example 4 was reduced by 0.5 millivolts per charge-discharge cycle. Although the reduction of 0.5 millivolts was small, the initial discharge capacity of the battery prepared in Comparative example 4 was only 140 mAh/g. The initial discharge capacity of the battery prepared in Comparative example 4 was significantly smaller than the initial discharge capacities of the batteries prepared in Examples 1 and 2. Therefore, it is considered that a battery having a low voltage drop cannot be provided using the positive electrode active material used in Comparative example 4 (this positive electrode active material is a known positive electrode active material).

Reference examples are described below. The positive electrode active materials used in Reference examples below included the first lithium composite oxide but did not include the second lithium composite oxide.

Reference Example 1-1

Preparation of Positive Electrode Active Material

A mixture of LiF, $Li_2MnO_3$, and $LiMnO_2$ was prepared such that the mixture had a Li/Mn/O/F molar ratio of 1.2/0.8/1.67/0.33.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor of a lithium composite oxide.

The precursor was subjected to a powder X-ray diffraction measurement.

The results of the measurement confirmed that the space group of the precursor was Fm-3m.

The above precursor was subjected to a heat treatment at 500° C. for 1 hour in an air atmosphere. Hereby, a positive electrode active material of Reference example 1-1 was prepared.

The positive electrode active material prepared in Reference example 1-1 was subjected to a powder X-ray diffraction measurement.

The space group of the positive electrode active material prepared in Reference example 1-1 was identified as Fd-3m.

The positive electrode active material prepared in Reference example 1-1 had an integrated intensity ratio $I_{(18°-20°)}/I_{(43°-46°)}$ of 0.23.

Preparation of Battery

With 70 parts by mass of the positive electrode active material prepared in Reference example 1-1, 20 parts by mass of acetylene black, 10 parts by mass of polyvinylidene fluoride (hereinafter, abbreviated as "PVDF"), and an appropriate amount of N-methyl-2-pyrrolidone (hereinafter, abbreviated as "NMP") were mixed. Hereby, a positive electrode mixture slurry was prepared. The acetylene black served as a conductant agent. The polyvinylidene fluoride served as a binding agent.

The positive electrode mixture slurry was applied onto one of the surfaces of a positive electrode current collector formed of an aluminum foil having a thickness of 20 micrometers.

The positive electrode mixture slurry was dried and then rolled. Hereby, a positive electrode plate including a positive electrode active material layer was prepared. The positive electrode plate had a thickness of 60 micrometers.

The positive electrode plate was stamped into a predetermined shape. Hereby, a circular positive electrode having a diameter of 12.5 mm was prepared.

A lithium metal foil having a thickness of 300 micrometers was stamped into a predetermined shape. Hereby, a circular negative electrode having a diameter of 14 mm was prepared.

Fluoroethylene carbonate (hereinafter, abbreviated as "FEC"), ethylene carbonate (hereinafter, abbreviated as "EC"), and ethyl methyl carbonate (hereinafter, abbreviated as "EMC") were mixed with one another at a volume ratio of 1:1:6 to form a nonaqueous solvent.

$LiPF_6$ was dissolved in the nonaqueous solvent at a concentration of 1.0 mol/liter. Hereby, a nonaqueous electrolyte solution was prepared.

A separator was impregnated with the nonaqueous electrolyte solution. The separator was a product of Celgard (Product number: 2320, thickness: 25 micrometers). The separator was a three-layer separator constituted by a polypropylene layer, a polyethylene layer, and a polypropylene layer.

A coin-shaped battery having a diameter of 20 mm and a thickness of 3.2 mm was prepared using the positive electrode, the negative electrode, and the separator in a dry box in which the dew point was kept at −50 degrees Celsius.

Reference Examples 1-2 to 1-19

In Reference examples 1-2 to 1-19, a positive electrode active material and a coin-shaped battery including the positive electrode active material were prepared as in Reference example 1-1, except the items (i) and (ii) below.

(i) the conditions under which the precursor was prepared and the mixing ratio of Li/Me/O/F were changed.

(ii) the conditions under which the heating was performed were changed within the ranges of 400° C. to 600° C. and 30 minutes to 2 hours.

For further details, refer to Tables 4 to 7.

The space groups of the positive electrode active materials prepared in Reference examples 1-2 to 1-19 were identified as Fd-3m.

Each of the precursors used in Reference examples 1-2 to 1-19 was prepared by weighing the raw materials on the basis of the stoichiometric ratio as in Reference example 1-1 and mixing the raw materials with one another.

For example, in Reference example 1-4, LiF, $Li_2MnO_3$, $LiMnO_2$, $LiCoO_2$, and LiNiO were weighed such that a Li/Mn/Co/Ni/O/F molar ratio of 1.2/0.6/0.1/0.1/1.67/0.33 was achieved and then mixed with one another.

Reference Example 1-20

In Reference example 1-20, a positive electrode active material having a composition represented by $Li_{1.2}Mn_{0.8}O_2$ was prepared as in Reference example 1-1.

In Reference example 1-20, LiF was not used as a raw material.

The space group of the positive electrode active material prepared in Reference example 1-20 was identified as Fd-3m.

The positive electrode active material prepared in Reference example 1-20 had an integrated intensity ratio $I_{(18°-20°)}/I_{(43°-46°)}$ of 0.15.

In Reference example 1-20, a coin-shaped battery was also prepared as in Reference example 1-1.

Reference Example 1-21

In Reference example 1-21, a positive electrode active material having a composition represented by $LiMn_2O_4$ (lithium manganese composite oxide) was prepared by a known method.

The positive electrode active material prepared in Reference example 1-21 was subjected to a powder X-ray diffraction measurement.

The results of the measurement confirmed that the space group of the positive electrode active material prepared in Reference example 1-21 was Fd-3m.

The positive electrode active material prepared in Reference example 1-21 had an integrated intensity ratio $I_{(18°-20°)}/I_{(43°-46°)}$ of 1.30.

In Reference example 1-21, a coin-shaped battery was also prepared as in Reference example 1-1.

Reference Example 1-22

In Reference example 1-22, a positive electrode active material having a composition represented by $Li_{1.2}Mn_{0.8}O_{1.67}F_{0.33}$ was prepared as in Reference example 1-1.

In Reference example 1-22, the heat treatment was performed at 500° C. for 5 hours.

The space group of the positive electrode active material prepared in Reference example 1-22 was identified as Fd-3m.

The positive electrode active material prepared in Reference example 1-22 had an integrated intensity ratio $I_{(18°-20°)}/I_{(43°-46°)}$ of 1.04.

In Reference example 1-22, a coin-shaped battery was also prepared as in Reference example 1-1.

Reference Example 1-23

In Reference example 1-23, a positive electrode active material having a composition represented by $Li_{1.2}Mn_{0.8}O_{1.67}F_{0.33}$ was prepared as in Reference example 1-1.

In Reference example 1-23, the heat treatment was performed at 500° C. for 10 minutes.

The space group of the positive electrode active material prepared in Reference example 1-23 was identified as Fd-3m.

The positive electrode active material prepared in Reference example 1-23 had an integrated intensity ratio $I_{(18°-20°)}/I_{(43°-46°)}$ of 0.02.

In Reference example 1-23, a coin-shaped battery was also prepared as in Reference example 1.

Battery Evaluations

The battery prepared in Reference example 1-1 was charged to a voltage of 4.9 volts at a current density of 0.5 $mA/cm^2$.

Subsequently, the battery prepared in Reference example 1-1 was discharged to a voltage of 2.5 volts at a current density of 0.5 $mA/cm^2$.

The initial discharge capacity of the battery prepared in Reference example 1-1 was 300 mAh/g.

The battery prepared in Reference example 1-21 was charged to a voltage of 4.3 volts at a current density of 0.5 $mA/cm^2$.

Subsequently, the battery prepared in Reference example 1-21 was discharged to a voltage of 2.5 volts at a current density of 0.5 $mA/cm^2$.

The initial discharge capacity of the battery prepared in Reference example 1-21 was 140 mAh/g.

The initial discharge capacities of the batteries prepared in Reference examples 1-2 to 1-20 and Reference examples 1-22 and 1-23 were measured as described above.

Tables 4 to 7 describe the results.

TABLE 4

| | Composition | x/y | α/β | (x + y)/(α + β) |
|---|---|---|---|---|
| Reference example 1-1 | $Li_{1.2}Mn_{0.8}O_{1.67}F_{0.33}$ | 1.5 | 5 | 1.0 |
| Reference example 1-2 | $Li_{1.2}Mn_{0.8}O_{1.67}F_{0.33}$ | 1.5 | 5 | 1.0 |
| Reference example 1-3 | $Li_{1.2}Mn_{0.8}O_{1.67}F_{0.33}$ | 1.5 | 5 | 1.0 |
| Reference example 1-4 | $Li_{1.2}Mn_{0.6}Co_{0.1}Ni_{0.1}O_{1.67}F_{0.33}$ | 1.5 | 5 | 1.0 |
| Reference example 1-5 | $Li_{1.2}Mn_{0.4}Co_{0.2}Ni_{0.2}O_{1.67}F_{0.33}$ | 1.5 | 5 | 1.0 |

TABLE 4-continued

|  | Composition | x/y | α/β | (x + y)/(α + β) |
|---|---|---|---|---|
| Reference example 1-6 | $Li_{1.2}Mn_{0.8}O_{1.9}F_{0.1}$ | 1.5 | 19 | 1.0 |
| Reference example 1-7 | $Li_{1.1}Mn_{0.8}O_{1.67}F_{0.33}$ | 1.38 | 5 | 0.95 |
| Reference example 1-8 | $Li_{1.2}Mn_{0.75}B_{0.05}O_{1.67}F_{0.33}$ | 1.5 | 5 | 1.0 |
| Reference example 1-9 | $Li_{1.2}Mn_{0.75}P_{0.05}O_{1.67}F_{0.33}$ | 1.5 | 5 | 1.0 |
| Reference example 1-10 | $Li_{1.2}Mn_{0.75}Al_{0.05}O_{1.67}F_{0.33}$ | 1.5 | 5 | 1.0 |
| Reference example 1-11 | $Li_{1.2}Mn_{0.75}Ti_{0.05}O_{1.67}F_{0.33}$ | 1.5 | 5 | 1.0 |
| Reference example 1-12 | $Li_{1.2}Mn_{0.75}Nb_{0.05}O_{1.67}F_{0.33}$ | 1.5 | 5 | 1.0 |
| Reference example 1-13 | $Li_{1.2}Mn_{0.75}W_{0.05}O_{1.67}F_{0.33}$ | 1.5 | 5 | 1.0 |
| Reference example 1-14 | $Li_{1.2}Mn_{0.75}V_{0.05}O_{1.67}F_{0.33}$ | 1.5 | 5 | 1.0 |

TABLE 5

|  | Space group | Integrated intensity ratio $I_{(18°-20°)}/I_{(43°-46°)}$ | Initial discharge capacity (mAh/g) |
|---|---|---|---|
| Reference example 1-1 | Fd-3m | 0.23 | 300 |
| Reference example 1-2 | Fd-3m | 0.05 | 284 |
| Reference example 1-3 | Fd-3m | 0.70 | 272 |
| Reference example 1-4 | Fd-3m | 0.30 | 287 |
| Reference example 1-5 | Fd-3m | 0.25 | 275 |
| Reference example 1-6 | Fd-3m | 0.25 | 292 |
| Reference example 1-7 | Fd-3m | 0.29 | 297 |
| Reference example 1-8 | Fd-3m | 0.28 | 285 |
| Reference example 1-9 | Fd-3m | 0.24 | 289 |
| Reference example 1-10 | Fd-3m | 0.23 | 282 |
| Reference example 1-11 | Fd-3m | 0.23 | 280 |
| Reference example 1-12 | Fd-3m | 0.19 | 277 |
| Reference example 1-13 | Fd-3m | 0.20 | 276 |
| Reference example 1-14 | Fd-3m | 0.22 | 281 |

TABLE 6

|  | Composition | x/y | α/β | (x + y)/(α + β) |
|---|---|---|---|---|
| Reference example 1-15 | $Li_{1.2}Mn_{0.75}Cr_{0.05}O_{1.67}F_{0.33}$ | 1.5 | 5 | 1.0 |
| Reference example 1-16 | $Li_{1.2}Mn_{0.75}Si_{0.05}O_{1.67}F_{0.33}$ | 1.5 | 5 | 1.0 |
| Reference example 1-17 | $Li_{1.2}Mn_{0.75}Fe_{0.05}O_{1.67}F_{0.33}$ | 1.5 | 5 | 1.0 |
| Reference example 1-18 | $Li_{1.2}Mn_{0.75}Cu_{0.05}O_{1.67}F_{0.33}$ | 1.5 | 5 | 1.0 |
| Reference example 1-19 | $Li_{1.2}Mn_{0.75}Ru_{0.05}O_{1.67}F_{0.33}$ | 1.5 | 5 | 1.0 |
| Reference example 1-20 | $Li_{1.2}Mn_2O_2$ | 1.5 | — | 1.0 |
| Reference example 1-21 | $LiMn_2O_4$ | 0.5 | — | 0.75 |
| Reference example 1-22 | $Li_{1.2}Mn_{0.8}O_{1.67}F_{0.33}$ | 1.5 | 5 | 1.0 |
| Reference example 1-23 | $Li_{1.2}Mn_{0.8}O_{1.67}F_{0.33}$ | 1.5 | 5 | 1.0 |

TABLE 7

|  | Space group | Integrated intensity ratio $I_{(18°-20°)}/I_{(43°-46°)}$ | Initial discharge capacity (mAh/g) |
|---|---|---|---|
| Reference example 1-15 | Fd-3m | 0.22 | 283 |
| Reference example 1-16 | Fd-3m | 0.24 | 275 |
| Reference example 1-17 | Fd-3m | 0.19 | 276 |
| Reference example 1-18 | Fd-3m | 0.22 | 274 |
| Reference example 1-19 | Fd-3m | 0.21 | 278 |
| Reference example 1-20 | Fd-3m | 0.15 | 267 |
| Reference example 1-21 | Fd-3m | 1.30 | 140 |
| Reference example 1-22 | Fd-3m | 1.04 | 238 |
| Reference example 1-23 | Fd-3m | 0.02 | 251 |

As described in Tables 4 to 7, the batteries prepared in Reference examples 1-1 to 1-20 had an initial discharge capacity of 267 to 300 mAh/g.

In other words, the batteries prepared in Reference examples 1-1 to 1-20 had a larger initial discharge capacity than the batteries prepared in Reference examples 1-21 to 1-23.

This is presumably because the lithium composite oxides included in the positive electrode active materials of the batteries prepared in Reference examples 1-1 to 1-20 had a crystal structure belonging to the space group Fd-3m and the integrated intensity ratios $I_{(18°-20°)}/I_{(43°-46°)}$ of the lithium composite oxides which were determined from X-ray diffraction patterns were greater than or equal to 0.05 and less than or equal to 0.90. Since the integrated intensity ratios $I_{(18°-20°)}/I_{(43°-46°)}$ were greater than or equal to 0.05 and less than or equal to 0.90, cation mixing between Li and Me occurred to a sufficient degree. This presumably increased the amount of Li atoms adjacent to one another and enhanced the diffusibility of Li. It is considered that the comprehensive action of the above advantageous effects markedly increased the initial discharge capacities.

It is considered that, in Reference example 1-21, where the integrated intensity ratio $I_{(18°-20°)}/I_{(43°-46°)}$ was higher than 0.90, cation mixing was suppressed and the number of three-dimensional lithium diffusion channels was reduced consequently. Furthermore, it is considered that, in Reference example 1-21, where the (x/y) ratio was low, the amount of Li responsible for the reaction was small and the diffusibility of Li ions was low. This presumably reduced the initial discharge capacity.

It is considered that, in Reference example 1-22, where the integrated intensity ratio $I_{(18°-20°)}/I_{(43°-46°)}$ was higher than 0.90, cation mixing was suppressed and the number of three-dimensional lithium diffusion channels was reduced consequently. This presumably reduced the initial discharge capacity.

It is considered that, in Reference example 1-23, where the integrated intensity ratio $I_{(18°-20°)}/I_{(43°-46°)}$ was lower than 0.05, the crystal structure became thermodynamically unstable and collapsed upon the deintercalation of Li during charging. This presumably reduced the initial discharge capacity.

As described in Tables 4 and 5, the battery prepared in Reference example 1-2 had a smaller initial discharge capacity than the battery prepared in Reference example 1-1.

This is presumably because the battery prepared in Reference example 1-2 had a lower integrated intensity ratio $I_{(18°-20°)}/I_{(43°-46°)}$ than the battery prepared in Reference example 1-1. This presumably degraded the stability of crystal structure and resulted in the reduction in initial discharge capacity.

As described in Tables 4 and 5, the battery prepared in Reference example 1-3 had a smaller initial discharge capacity than the battery prepared in Reference example 1-1.

This is presumably because the battery prepared in Reference example 1-3 had a higher integrated intensity ratio $I_{(18°-20°)}/I_{(43°-46°)}$ than the battery prepared in Reference example 1-1. It is considered that this suppressed cation mixing and slightly reduced the number of three-dimensional lithium diffusion channels consequently. This presumably reduced the initial discharge capacity.

As described in Tables 4 and 5, the battery prepared in Reference example 1-4 had a smaller initial discharge capacity than the battery prepared in Reference example 1-1.

This is presumably because the battery prepared in Reference example 1-4 included a lower content of Mn, which is capable of readily combining with oxygen to form a hybrid orbital, than the battery prepared in Reference example 1-1. Co and Ni are less likely to combine with oxygen to form a hybrid orbital than Mn. This presumably resulted in the deintercalation of oxygen during charging, the destabilization of crystal structure, and a reduction in the contribution of oxygen to the oxidation reduction reaction. It is considered that the initial discharge capacity was reduced for the above-described reasons.

As described in Tables 4 and 5, the battery prepared in Reference example 1-5 had a smaller initial discharge capacity than the battery prepared in Reference example 1-1.

This is presumably because the battery prepared in Reference example 1-5 included a lower content of Mn, which is capable of readily combining with oxygen to form a hybrid orbital, than the battery prepared in Reference example 1-1. This presumably resulted in the deintercalation of oxygen during charging, the destabilization of crystal structure, and a reduction in the contribution of oxygen to the oxidation reduction reaction. It is considered that the initial discharge capacity was reduced for the above-described reasons.

As described in Tables 4 and 5, the battery prepared in Reference example 1-6 had a smaller initial discharge capacity than the battery prepared in Reference example 1-1.

This is presumably because the battery prepared in Reference example 1-6 had a higher ($\alpha/\beta$) ratio than the battery prepared in Reference example 1-1. That is, a capacity due to the oxidation and reduction of oxygen was excessively large. Furthermore, the impact of F, which has high electronegativity, was small. Therefore, it is considered that the crystal structure became unstable upon the deintercalation of Li. This presumably reduced the initial discharge capacity.

As described in Tables 4 and 5, the battery prepared in Reference example 1-7 had a smaller initial discharge capacity than the battery prepared in Reference example 1-1.

This is presumably because the battery prepared in Reference example 1-7 had a lower x/y ratio (x/y=1.38) than the battery prepared in Reference example 1-1. It is considered that the amount of isolated Li present in the crystal structure was increased and the amount of Li responsible for the reaction was reduced accordingly. This presumably degraded the diffusibility of Li ions and reduced the initial discharge capacity. On the other hand, the cycle characteristics were improved because the isolated Li served as pillars.

As described in Tables 4 to 7, the batteries prepared in Reference examples 1-8 to 1-19 had a smaller initial discharge capacity than the battery prepared in Reference example 1-1.

This is presumably because the batteries prepared in Reference examples 1-8 to 1-19 included a lower content of Mn, which is capable of readily combining with oxygen to form a hybrid orbital, than the battery prepared in Reference example 1-1. This presumably reduced the contribution of oxygen to the oxidation reduction reaction and resulted in the reduction in initial discharge capacity.

As described in Tables 6 and 7, the battery prepared in Reference example 1-20 had a smaller initial discharge capacity than the battery prepared in Reference example 1-1.

This is presumably because the lithium composite oxide included in the battery prepared in Reference example 1-20 did not include F. It is considered that the cation-anion interaction was reduced because any of the oxygen atoms were not replaced with F atoms, which have high electronegativity. This presumably degraded the stability of crystal structure due to the deintercalation of oxygen during charging and resulted in the reduction in initial discharge capacity.

Reference Example 2-1

Preparation of Positive Electrode Active Material

A mixture of LiF, $Li_2MnO_3$, and $LiMnO_2$ was prepared such that the mixture had a Li/Mn/O/F molar ratio of 1.2/0.8/1.67/0.33.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor.

The precursor was subjected to a powder X-ray diffraction measurement.

The results of the measurement confirmed that the space group of the precursor was Fm-3m.

The above precursor was subjected to a heat treatment at 500° C. for 2 hours in an air atmosphere. Hereby, a positive electrode active material of Reference example 2-1 was prepared.

The positive electrode active material prepared in Reference example 2-1 was subjected to a powder X-ray diffraction measurement.

The positive electrode active material prepared in Reference example 2-1 was subjected to an electron diffraction measurement. The results of the powder X-ray diffraction measurement and the electron diffraction measurement confirmed that the positive electrode active material prepared in Reference example 2-1 was a two-phase mixture having the space group Fm-3m and the space group Fd-3m.

The positive electrode active material prepared in Reference example 2-1 had an integrated intensity ratio $I_{(18°-20°)}/I_{(43°-46°)}$ of 0.50.

Preparation of Battery

With 70 parts by mass of the positive electrode active material prepared in Reference example 2-1, 20 parts by mass of acetylene black, 10 parts by mass of polyvinylidene fluoride (hereinafter, abbreviated as "PVDF"), and an appropriate amount of N-methyl-2-pyrrolidone (hereinafter, abbreviated as "NMP") were mixed. Hereby, a positive electrode mixture slurry was prepared. The acetylene black served as a conductant agent. The polyvinylidene fluoride served as a binding agent.

The positive electrode mixture slurry was applied onto one of the surfaces of a positive electrode current collector formed of an aluminum foil having a thickness of 20 micrometers.

The positive electrode mixture slurry was dried and then rolled. Hereby, a positive electrode plate including a positive electrode active material layer was prepared. The positive electrode plate had a thickness of 60 micrometers.

The positive electrode plate was stamped into a predetermined shape. Hereby, a circular positive electrode having a diameter of 12.5 mm was prepared.

A lithium metal foil having a thickness of 300 micrometers was stamped into a predetermined shape. Hereby, a circular negative electrode having a diameter of 14 mm was prepared.

Fluoroethylene carbonate (hereinafter, abbreviated as "FEC"), ethylene carbonate (hereinafter, abbreviated as "EC"), and ethyl methyl carbonate (hereinafter, abbreviated as "EMC") were mixed with one another at a volume ratio of 1:1:6 to form a nonaqueous solvent.

$LiPF_6$ was dissolved in the nonaqueous solvent at a concentration of 1.0 mol/liter. Hereby, a nonaqueous electrolyte solution was prepared.

A separator was impregnated with the nonaqueous electrolyte solution. The separator was a product of Celgard (Product number: 2320, thickness: 25 micrometers). The separator was a three-layer separator constituted by a polypropylene layer, a polyethylene layer, and a polypropylene layer.

A coin-shaped battery having a diameter of 20 mm and a thickness of 3.2 mm was prepared using the positive electrode, the negative electrode, and the separator in a dry box in which the dew point was kept at −50 degrees Celsius.

Reference Example 2-2

Preparation of Positive Electrode Active Material

A mixture of LiF, $Li_2MnO_3$, $LiMnO_2$, and $LiCoO_2$ was prepared such that the mixture had a Li/Mn/Co/O/F molar ratio of 1.2/0.4/0.4/1.67/0.33.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor.

The precursor was subjected to a powder X-ray diffraction measurement.

The results of the measurement confirmed that the space group of the precursor was Fm-3m.

The above precursor was subjected to a heat treatment at 300° C. for 30 minutes in an air atmosphere. Hereby, a positive electrode active material of Reference example 2-2 was prepared.

The positive electrode active material prepared in Reference example 2-2 was subjected to a powder X-ray diffraction measurement.

The positive electrode active material prepared in Reference example 2-2 was subjected to an electron diffraction measurement.

The results of the powder X-ray diffraction measurement and the electron diffraction measurement confirmed that the positive electrode active material prepared in Reference example 2-2 was a two-phase mixture having the space group Fm-3m and the space group R-3m.

The positive electrode active material prepared in Reference example 2-2 had an integrated intensity ratio $I_{(18°-20°)}/I_{(43°-46°)}$ of 0.24.

A coin-shaped battery of Reference example 2-2 was prepared as in Reference example 2-1.

Reference Example 2-3

Preparation of Positive Electrode Active Material

A mixture of LiF, $Li_2MnO_3$, $LiMnO_2$, $LiCoO_2$, and $LiNiO_2$ was prepared such that the mixture had a Li/Mn/Co/Ni/O/F molar ratio of 1.2/0.54/0.13/0.13/1.9/0.1.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor.

The precursor was subjected to a powder X-ray diffraction measurement.

The results of the measurement confirmed that the space group of the precursor was Fm-3m.

The above precursor was subjected to a heat treatment at 500° C. for 30 minutes in an air atmosphere. Hereby, a positive electrode active material of Reference example 2-3 was prepared.

The positive electrode active material prepared in Reference example 2-3 was subjected to a powder X-ray diffraction measurement.

The positive electrode active material prepared in Reference example 2-3 was subjected to an electron diffraction measurement.

The results of the powder X-ray diffraction measurement and the electron diffraction measurement confirmed that the positive electrode active material prepared in Reference example 2-3 was a two-phase mixture having the space group Fm-3m and the space group C2/m.

The positive electrode active material prepared in Reference example 2-3 had an integrated intensity ratio $I_{(18°-20°)}/I_{(43°-46°)}$ of 0.30.

A coin-shaped battery of Reference example 2-3 was prepared as in Reference example 2-1.

Reference Examples 2-4 to 2-21

In Reference examples 2-4 to 2-21, a positive electrode active material and a coin-shaped battery including the positive electrode active material were prepared as in Reference example 2-1, except the items (i) and (ii) below.

(i) the conditions under which the precursor was prepared and the mixing ratio of Li/Me/O/F were changed.

(ii) the conditions under which the heating was performed were changed within the ranges of 300° C. to 500° C. and 30 minutes to 2 hours.

For further details, refer to Tables 8 to 11.

The positive electrode active materials prepared in Reference examples 2-4 to 2-21 were identified as a two-phase mixture including a phase belonging to the space group Fm-3m and a phase belonging to the space group Fd-3m.

Each of the precursors used in Reference examples 2-4 to 2-21 was prepared as in Reference example 2-1 by weighing the raw materials on the basis of the stoichiometric ratio and mixing the raw materials with one another.

Coin-shaped batteries of Reference examples 2-4 to 2-21 were prepared as in Reference example 2-1.

Reference Example 2-22

In Reference example 2-22, a positive electrode active material having a composition represented by $Li_{1.2}Mn_{0.54}Co_{0.13}Ni_{0.13}O_2$ was prepared as in Reference example 2-1.

In Reference example 2-22, LiF was not used as a raw material.

The positive electrode active material prepared in Reference example 2-22 was identified as a two-phase mixture including a phase belonging to the space group Fm-3m and a phase belonging to the space group Fd-3m.

The positive electrode active material prepared in Reference example 2-22 had an integrated intensity ratio $I_{(18°-20°)}/I_{(43°-46°)}$ of 0.25.

A coin-shaped battery of Reference example 2-22 was prepared as in Reference example 2-1.

Reference Example 2-23

In Reference example 2-23, a positive electrode active material having a composition represented by $LiCoO_2$ (lithium cobalt oxide) was prepared by a known method.

The positive electrode active material prepared in Reference example 2-23 was subjected to a powder X-ray diffraction measurement.

The results of the measurement confirmed that the space group of the positive electrode active material prepared in Reference example 2-23 was R-3m.

The positive electrode active material prepared in Reference example 2-23 had an integrated intensity ratio $I_{(18°-20°)}/I_{(43°-46°)}$ of 1.27.

A coin-shaped battery of Reference example 2-23 was prepared as in Reference example 2-1.

Reference Example 2-24

In Reference example 2-24, a positive electrode active material represented by $Li_{1.2}Mn_{0.8}O_{1.67}F_{0.33}$ was prepared as in Reference example 2-1.

In Reference example 2-24, the heat treatment was performed at 700° C. for 10 hours.

The positive electrode active material prepared in Reference example 2-24 was subjected to a powder X-ray diffraction measurement.

The positive electrode active material prepared in Reference example 2-24 was subjected to an electron diffraction measurement.

The results of the powder X-ray diffraction measurement and the electron diffraction measurement confirmed that the positive electrode active material prepared in Reference example 2-24 was a two-phase mixture having the space group Fm-3m and the space group Fd-3m.

The positive electrode active material prepared in Reference example 2-24 had an integrated intensity ratio $I_{(18°-20°)}/I_{(43°-46°)}$ of 1.05.

A coin-shaped battery of Reference example 2-24 was prepared as in Reference example 2-1.

Reference Example 2-25

In Reference example 2-25, a positive electrode active material represented by $Li_{1.2}Mn_{0.8}O_{1.67}F_{0.33}$ was prepared as in Reference example 2-1.

In Reference example 2-25, the heat treatment was performed at 300° C. for 10 minutes.

The positive electrode active material prepared in Reference example 2-25 was subjected to a powder X-ray diffraction measurement.

The positive electrode active material prepared in Reference example 2-25 was subjected to an electron diffraction measurement.

The results of the powder X-ray diffraction measurement and the electron diffraction measurement confirmed that the positive electrode active material prepared in Reference example 2-25 was a two-phase mixture having the space group Fm-3m and the space group Fd-3m.

The positive electrode active material prepared in Reference example 2-25 had an integrated intensity ratio $I_{(18°-20°)}/I_{(43°-46°)}$ of 0.02.

A coin-shaped battery of Reference example 2-25 was prepared as in Reference example 2-1.

Battery Evaluations

The battery prepared in Reference example 2-1 was charged to a voltage of 4.9 volts at a current density of 0.5 mA/cm².

Subsequently, the battery prepared in Reference example 2-1 was discharged to a voltage of 2.5 volts at a current density of 0.5 mA/cm².

The initial discharge capacity of the battery prepared in Reference example 2-1 was 299 mAh/g.

The battery prepared in Reference example 2-23 was charged to a voltage of 4.3 volts at a current density of 0.5 mA/cm².

Subsequently, the battery prepared in Reference example 2-23 was discharged to a voltage of 2.5 volts at a current density of 0.5 mA/cm².

The initial discharge capacity of the battery prepared in Reference example 2-23 was 140 mAh/g.

The initial discharge capacities of the coin-shaped batteries prepared in Reference examples 2-2 to 2-25 were measured as described above.

Tables 8 to 11 describe the results.

TABLE 8

| | Composition | x/y | α/β | (x + y)/(α + β) |
|---|---|---|---|---|
| Reference example 2-1 | $Li_{1.2}Mn_{0.8}O_{1.33}F_{0.67}$ | 1.5 | 2 | 1.0 |
| Reference example 2-2 | $Li_{1.2}Mn_{0.4}Co_{0.4}O_{1.9}F_{0.1}$ | 1.5 | 19 | 1.0 |
| Reference example 2-3 | $Li_{1.2}Mn_{0.54}Co_{0.13}Ni_{0.13}O_{1.9}F_{0.1}$ | 1.5 | 19 | 1.0 |
| Reference example 2-4 | $Li_{1.2}Mn_{0.8}O_{1.33}F_{0.67}$ | 1.5 | 2 | 1.0 |
| Reference example 2-5 | $Li_{1.2}Mn_{0.8}O_{1.33}F_{0.67}$ | 1.5 | 2 | 1.0 |
| Reference example 2-6 | $Li_{1.2}Mn_{0.8}O_{1.33}F_{0.67}$ | 1.5 | 2 | 1.0 |
| Reference example 2-7 | $Li_{1.2}Mn_{0.8}O_{1.33}F_{0.67}$ | 1.38 | 2 | 0.95 |
| Reference example 2-8 | $Li_{1.2}Mn_{0.8}O_{1.9}F_{0.1}$ | 1.5 | 19 | 1.0 |
| Reference example 2-9 | $Li_{1.25}Mn_{0.75}O_{1.33}F_{0.67}$ | 1.67 | 2 | 1.0 |
| Reference example 2-10 | $Li_{1.2}Mn_{0.75}B_{0.05}O_{1.67}F_{0.33}$ | 1.5 | 5 | 1.0 |
| Reference example 2-11 | $Li_{1.2}Mn_{0.75}P_{0.05}O_{1.67}F_{0.33}$ | 1.5 | 5 | 1.0 |
| Reference example 2-12 | $Li_{1.2}Mn_{0.75}Al_{0.05}O_{1.67}F_{0.33}$ | 1.5 | 5 | 1.0 |
| Reference example 2-13 | $Li_{1.2}Mn_{0.75}Ti_{0.05}O_{1.67}F_{0.33}$ | 1.5 | 5 | 1.0 |
| Reference example 2-14 | $Li_{1.2}Mn_{0.75}Nb_{0.05}O_{1.67}F_{0.33}$ | 1.5 | 5 | 1.0 |

TABLE 9

| | Space group | Integrated intensity ratio $I_{(18°-20°)}/I_{(43°-46°)}$ | Initial discharge capacity (mAh/g) |
|---|---|---|---|
| Reference example 2-1 | Fd-3m | 0.50 | 299 |
| Reference example 2-2 | R-3m | 0.24 | 260 |
| Reference example 2-3 | C2/m | 0.30 | 295 |
| Reference example 2-4 | Fd-3m | 0.70 | 282 |
| Reference example 2-5 | Fd-3m | 0.90 | 275 |
| Reference example 2-6 | Fd-3m | 0.05 | 269 |
| Reference example 2-7 | Fd-3m | 0.10 | 297 |
| Reference example 2-8 | Fd-3m | 0.37 | 277 |
| Reference example 2-9 | Fd-3m | 0.44 | 263 |
| Reference example 2-10 | Fd-3m | 0.50 | 293 |
| Reference example 2-11 | Fd-3m | 0.50 | 289 |
| Reference example 2-12 | Fd-3m | 0.50 | 290 |
| Reference example 2-13 | Fd-3m | 0.50 | 289 |
| Reference example 2-14 | Fd-3m | 0.50 | 281 |

TABLE 10

|  | Composition | x/y | α/β | (x + y)/(α + β) |
|---|---|---|---|---|
| Reference example 2-15 | $Li_{1.2}Mn_{0.75}W_{0.05}O_{1.67}F_{0.33}$ | 1.5 | 5 | 1.0 |
| Reference example 2-16 | $Li_{1.2}Mn_{0.75}V_{0.05}O_{1.67}F_{0.33}$ | 1.5 | 5 | 1.0 |
| Reference example 2-17 | $Li_{1.2}Mn_{0.75}Cr_{0.05}O_{1.67}F_{0.33}$ | 1.5 | 5 | 1.0 |
| Reference example 2-18 | $Li_{1.2}Mn_{0.75}Si_{0.05}O_{1.67}F_{0.33}$ | 1.5 | 5 | 1.0 |
| Reference example 2-19 | $Li_{1.2}Mn_{0.75}Fe_{0.05}O_{1.67}F_{0.33}$ | 1.5 | 5 | 1.0 |
| Reference example 2-20 | $Li_{1.2}Mn_{0.75}Cu_{0.05}O_{1.67}F_{0.33}$ | 1.5 | 5 | 1.0 |
| Reference example 2-21 | $Li_{1.2}Mn_{0.75}Ru_{0.05}O_{1.67}F_{0.33}$ | 1.5 | 5 | 1.0 |
| Reference example 2-22 | $Li_{1.2}Mn_{0.54}Co_{0.13}Ni_{0.13}O_2$ | 1.5 | — | 1.0 |
| Reference example 2-23 | $LiCoO_2$ | 1.0 | — | 1.0 |
| Reference example 2-24 | $Li_{1.2}Mn_{0.8}O_{1.67}F_{0.33}$ | 1.5 | 5 | 1.0 |
| Reference example 2-25 | $Li_{1.2}Mn_{0.8}O_{1.67}F_{0.33}$ | 1.5 | 5 | 1.0 |

TABLE 11

|  | Space group | Integrated intensity ratio $I_{(18°-20°)}/I_{(43°-46°)}$ | Initial discharge capacity (mAh/g) |
|---|---|---|---|
| Reference example 2-15 | Fd-3m | 0.50 | 279 |
| Reference example 2-16 | Fd-3m | 0.50 | 284 |
| Reference example 2-17 | Fd-3m | 0.50 | 285 |
| Reference example 2-18 | Fd-3m | 0.50 | 280 |
| Reference example 2-19 | Fd-3m | 0.50 | 272 |
| Reference example 2-20 | Fd-3m | 0.50 | 279 |
| Reference example 2-21 | Fd-3m | 0.50 | 281 |
| Reference example 2-22 | C2/m | 0.25 | 272 |
| Reference example 2-23 | (R-3m) | 1.27 | 150 |
| Reference example 2-24 | Fd-3m | 1.05 | 254 |
| Reference example 2-25 | Fd-3m | 0.02 | 252 |

As described in Tables 8 to 11, the batteries prepared in Reference examples 2-1 to 2-22 had an initial discharge capacity of 260 to 299 mAh/g.

In other words, the batteries prepared in Reference examples 2-1 to 2-22 had a larger initial discharge capacity than the batteries prepared in Reference examples 2-23 to 2-25.

This is presumably because the lithium composite oxides included in the positive electrode active materials of the batteries prepared in Reference examples 2-1 to 2-22 included a first phase having a crystal structure belonging to the space group Fm-3m and a second phase having a crystal structure belonging to a space group other than the space group Fm-3m and the integrated intensity ratios $I_{(18°-20°)}/I_{(43°-46°)}$ of the lithium composite oxides which were determined from X-ray diffraction patterns were greater than or equal to 0.05 and less than or equal to 0.90. This presumably enabled the intercalation and deintercalation of a large amount of Li and enhanced the diffusibility of Li and the stability of crystal structure. It is considered that the comprehensive action of the above advantageous effects markedly increased the initial discharge capacities.

In Reference example 2-23, the integrated intensity ratio $I_{(18°-20°)}/I_{(43°-46°)}$ was higher than 0.90. Furthermore, in Reference example 2-23, the crystal structure was a single phase having only the space group R-3m. In other words, the crystal structure did not include the first phase having a crystal structure belonging to the space group Fm-3m. This presumably reduced the amount of Li intercalated and deintercalated during charging and discharging. In addition, since the (x/y) ratio was relatively low, the amount of Li responsible for the reaction was small. This presumably degraded the diffusibility of Li ions. It is considered that this significantly reduced the initial discharge capacity.

In Reference example 2-24, since the integrated intensity ratio $I_{(18°-20°)}/I_{(43°-46°)}$ was higher than 0.90, the proportion of the first phase was small. This presumably reduced the amount of Li intercalated and deintercalated during charging and discharging. In addition, a large amount of interfaces between the first and second phases were formed. This presumably degraded the diffusibility of Li ions. It is considered that this significantly reduced the initial discharge capacity.

In Reference example 2-25, since the integrated intensity ratio $I_{(18°-20°)}/I_{(43°-46°)}$ was lower than 0.05, the proportion of the second phase was small. This presumably degraded the diffusibility of Li ions and resulted in the reduction in initial discharge capacity.

As described in Tables 8 and 9, the battery prepared in Reference example 2-2 had a smaller initial discharge capacity than the battery prepared in Reference example 2-1.

This is presumably because, in Reference example 2-2, the second phase had a crystal structure belonging not to the space group Fd-3m but to the space group R-3m, unlike in Reference example 2-1. While a three-dimensional network constituted by transition metal-anion octahedrons, which serve as pillars, is formed in a crystal structure belonging to the space group Fd-3m (i.e., a spinel crystal structure), a two-dimensional network constituted by transition metal-anion octahedrons, which serve as pillars, is formed in a crystal structure belonging to the space group R-3m (i.e., a layered structure). This presumably degraded the stability of crystal structure and resulted in the reduction in initial discharge capacity.

As described in Tables 8 and 9, the battery prepared in Reference example 2-3 had a smaller initial discharge capacity than the battery prepared in Reference example 2-1.

This is presumably because, in Reference example 2-3, the second phase had a crystal structure belonging not to the space group Fd-3m but to the space group C2/m, compared with Reference example 2-1. While a three-dimensional network constituted by transition metal-anion octahedrons, which serve as pillars, is formed in a crystal structure belonging to the space group Fd-3m (i.e., a spinel crystal structure), a two-dimensional network constituted by transition metal-anion octahedrons, which serve as pillars, is formed in a crystal structure belonging to the space group C2/m (i.e., a layered structure). This presumably degraded the stability of crystal structure and resulted in the reduction in initial discharge capacity.

As described in Tables 8 and 9, the battery prepared in Reference example 2-4 had a smaller initial discharge capacity than the battery prepared in Reference example 2-1.

This is presumably because the battery prepared in Reference example 2-4 had a higher integrated intensity ratio $I_{(18°-20°)}/I_{(43°-46°)}$ than the battery prepared in Reference example 2-1. This resulted in a small proportion of the first phase and presumably reduced the amount of Li intercalated and deintercalated during charging and discharging. In addition, a large amount of interfaces between the first and second phases were formed. This presumably degraded the diffusibility of Li ions. It is considered that this significantly reduced the initial discharge capacity.

As described in Tables 8 and 9, the battery prepared in Reference example 2-5 had a smaller initial discharge capacity than the battery prepared in Reference example 2-1.

This is presumably because the battery prepared in Reference example 2-5 had a higher integrated intensity ratio $I_{(18°-20°)}/I_{(43°-46°)}$ than the battery prepared in Reference example 2-1. This resulted in a small proportion of the first phase and presumably reduced the amount of Li intercalated and deintercalated during charging and discharging. In addition, a large amount of interfaces between the first and second phases were formed. This presumably degraded the diffusibility of Li ions. It is considered that this significantly reduced the initial discharge capacity.

As described in Tables 8 and 9, the battery prepared in Reference example 2-6 had a smaller initial discharge capacity than the battery prepared in Reference example 2-1.

Since the battery prepared in Reference example 2-6 had a lower integrated intensity ratio $I_{(18°-20°)}/I_{(43°-46°)}$ than the battery prepared in Reference example 2-1, the proportion of the second phase is small in the battery prepared in Reference example 2-6. This presumably degraded the diffusibility of Li ions and resulted in the reduction in initial discharge capacity.

As described in Tables 8 and 9, the battery prepared in Reference example 2-7 had a smaller initial discharge capacity than the battery prepared in Reference example 2-1.

This is presumably because the battery prepared in Reference example 2-7 had a lower (x/y) ratio than the battery prepared in Reference example 2-1. It is considered that this increased the amount of isolated Li present in the crystal structure and reduced the amount of Li responsible for the reaction. This presumably degraded the diffusibility of Li ions and reduced the initial discharge capacity.

As described in Tables 8 and 9, the battery prepared in Reference example 2-8 had a smaller initial discharge capacity than the battery prepared in Reference example 2-1.

This is presumably because the battery prepared in Reference example 2-8 had a higher ($\alpha/\beta$) ratio than the battery prepared in Reference example 2-1. That is, the impact of F, which has high electronegativity, was small. This may cause delocalization of electrons and facilitate the oxidation reduction reaction of oxygen. It is considered that deintercalation of oxygen occurred and the crystal structure became unstable upon the deintercalation of Li. This presumably resulted in the reduction in initial discharge capacity.

As described in Tables 8 and 9, the battery prepared in Reference example 2-9 had a smaller initial discharge capacity than the battery prepared in Reference example 2-1.

This is presumably because the battery prepared in Reference example 2-9 had a higher (x/y) ratio than the battery prepared in Reference example 2-1. Thus, a further large amount of Li was deintercalated during charging. This presumably degraded the stability of the crystal structure and resulted in the reduction in initial discharge capacity.

As described in Tables 8 to 11, the batteries prepared in Reference examples 2-10 to 2-21 had a smaller initial discharge capacity than the battery prepared in Reference example 2-1.

This is presumably because the contents of Mn in the batteries prepared in Reference examples 2-10 to 2-21 were lower than in the battery prepared in Reference example 2-1 as a result of some of the Mn atoms, which are capable of readily combining with oxygen to form a hybrid orbital, being replaced with atoms of another element. This presumably reduced the contribution of oxygen to the oxidation reduction reaction and resulted in the reduction in initial discharge capacity.

As described in Tables 10 and 11, the battery prepared in Reference example 2-22 had a smaller initial discharge capacity than the battery prepared in Reference example 2-1.

This is presumably because, in Reference example 2-22, the lithium composite oxide did not include F. It is considered that the cation-anion interaction was reduced because any of the oxygen atoms were not replaced with F atoms, which have high electronegativity. This presumably degraded the stability of crystal structure due to the deintercalation of oxygen during charging at high voltages and resulted in the reduction in initial discharge capacity.

The positive electrode active material according to an embodiment of the present disclosure may be used as a positive electrode active material included in a battery, such as secondary battery.

What is claimed is:

1. A positive electrode active material comprising:
a lithium composite oxide,
wherein the lithium composite oxide includes a first lithium composite oxide and a second lithium composite oxide different from the first lithium composite oxide,
wherein the first lithium composite oxide has a crystal structure belonging to space group Fd-3m,
wherein at least a part of a surface of the first lithium composite oxide is covered with the second lithium composite oxide, and
wherein the second lithium composite oxide has a crystal structure belonging to space group Fd-3m,
wherein the first lithium composite oxide has an average composition represented by composition formula $Li_xMe_yO_\alpha Q_\beta$,
where
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al,
Q is at least one selected from the group consisting of F, Cl, N, and S, $1.05 \leq x \leq 1.4$, $0.6 \leq y \leq 0.95$, $1.2 \leq \alpha \leq 2$, and $0 \leq \beta \leq 0.8$, wherein the following mathematical formulas (I) and (II) are satisfied:

$0.05 \leq$ Integrated intensity ratio $I_{(18°-20°)}/I_{(43°-46°)} \leq 0.90$     (I), and $0.8 \leq$ Integrated intensity ratio $I_{(63°-65°)}/I_{(17°-19°)} \leq 2.0$     (II), where the integrated intensity ratio $I_{(18°-20°)}/I_{(43°-46°)}$ is a ratio of an integrated intensity $I_{(18°-20°)}$ to an integrated intensity $I_{(43°-46°)}$,
the integrated intensity ratio $I_{(63°-65°)}/I_{(17°-19°)}$ is a ratio of an integrated intensity $I_{(63°-65°)}$ to an integrated intensity $I_{(17°-19°)}$,
the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material,
the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material,
the integrated intensity $I_{(63°-65°)}$ is an integrated intensity of a third peak that is a maximum peak present in a range of angle of diffraction 2θ greater than or equal to 63° and less than or equal to 65° in the X-ray diffraction pattern of the positive electrode active material, and
the integrated intensity $I_{(17°-19°)}$ is an integrated intensity of a fourth peak that is a maximum peak present in a range of angle of diffraction 2θ greater than or equal to 17° and less than or equal to 19° in the X-ray diffraction pattern of the positive electrode active material.

2. The positive electrode active material according to claim 1,
wherein the integrated intensity ratio $I_{(18°-20°)}/I_{(43°-46°)}$ is greater than or equal to 0.05 and less than or equal to 0.70.

3. The positive electrode active material according to claim 2,
wherein the integrated intensity ratio $I_{(18°-20°)}/I_{(43°-46°)}$ is greater than or equal to 0.05 and less than or equal to 0.30.

4. The positive electrode active material according to claim 1,
wherein the integrated intensity ratio $I_{(63°-65°)}/I_{(17°-19°)}$ is greater than or equal to 1.3 and less than or equal to 1.6.

5. A positive electrode active material comprising:
a lithium composite oxide,
wherein the lithium composite oxide includes a first lithium composite oxide and a second lithium composite oxide different from the first lithium composite oxide,
wherein the first lithium composite oxide is a multiphase mixture including a first phase having a crystal structure belonging to space group Fm-3m and a second phase having a crystal structure belonging to a space group other than space group Fm-3m,
wherein at least a part of a surface of the first lithium composite oxide is covered with the second lithium composite oxide, and
wherein the second lithium composite oxide has a crystal structure belonging to space group Fd-3m,
wherein the first lithium composite oxide has an average composition represented by composition formula $Li_xMe_yO_\alpha Q_\beta$,
where
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al,
Q is at least one selected from the group consisting of F, Cl, N, and S, $1.05 \leq x \leq 1.4$, $0.6 \leq y \leq 0.95$, $1.2 \leq \alpha \leq 2$, and $0 \leq \beta \leq 0.8$, wherein the following mathematical formulas (I) and (II) are satisfied:

$0.05 \leq$ Integrated intensity ratio $I_{(18°-20°)}/I_{(43°-46°)} \leq 0.90$ (I), and $0.8 \leq$ Integrated intensity ratio $I_{(63°-65°)}/I_{(17°-19°)} \leq 2.0$ (II), where the integrated intensity ratio $I_{(18°-20°)}/I_{(43°-46°)}$ is a ratio of an integrated intensity $I_{(18°-20°)}$ to an integrated intensity $I_{(43°-46°)}$,
the integrated intensity ratio $I_{(63°-65°)}/I_{(17°-19°)}$ is a ratio of an integrated intensity $I_{(63°-65°)}$ to an integrated intensity $I_{(17°-19°)}$,
the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material,
the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material,
the integrated intensity $I_{(63°-65°)}$ is an integrated intensity of a third peak that is a maximum peak present in a range of angle of diffraction 2θ greater than or equal to 63° and less than or equal to 65° in the X-ray diffraction pattern of the positive electrode active material, and
the integrated intensity $I_{(17°-19°)}$ is an integrated intensity of a fourth peak that is a maximum peak present in a range of angle of diffraction 2θ greater than or equal to 17° and less than or equal to 19° in the X-ray diffraction pattern of the positive electrode active material.

6. The positive electrode active material according to claim 5,
wherein the crystal structure of the second phase belongs to at least one selected from the group consisting of space group Fd-3m, space group R-3m, and space group C2/m.

7. The positive electrode active material according to claim 6,
wherein the crystal structure of the second phase belongs to space group Fd-3m.

8. The positive electrode active material according to claim 1,
wherein the second lithium composite oxide is mixed with at least a part of the surface of the first lithium composite oxide to form a solid solution.

9. The positive electrode active material according to claim 1,
wherein a molar ratio of the second lithium composite oxide to the first lithium composite oxide is less than or equal to 50%.

10. The positive electrode active material according to claim 9,
wherein the molar ratio is greater than or equal to 6% and less than or equal to 29%.

11. The positive electrode active material according to claim 1,
wherein the second lithium composite oxide has a thickness of greater than or equal to 0.1 nm and less than or equal to 100 nm.

12. The positive electrode active material according to claim 11,
wherein the second lithium composite oxide has a thickness of greater than or equal to 0.5 nm and less than or equal to 6 nm.

13. The positive electrode active material according to claim 1,
wherein the first lithium composite oxide further includes Mn.

14. The positive electrode active material according to claim 1,
wherein the first lithium composite oxide includes at least one selected from the group consisting of F, Cl, N, and S.

15. The positive electrode active material according to claim 1,
wherein the first lithium composite oxide includes F.

16. The positive electrode active material according to claim 1,
wherein the following two mathematical formulas are satisfied:

$1.33 \leq \alpha \leq 2$, and $0 \leq \beta \leq 0.67$.

17. The positive electrode active material according to claim 16,
wherein the following two mathematical formulas are satisfied:

$$1.33 \leq \alpha \leq 1.9,\ \text{and}$$

$$0.1 \leq \beta \leq 0.67.$$

18. The positive electrode active material according to claim 1,
wherein the following two mathematical formulas are satisfied:

$$1.1 \leq x \leq 1.25,\ \text{and}$$

$$0.75 \leq y \leq 0.8.$$

19. The positive electrode active material according to claim 1,
wherein the lithium composite oxide is contained as a main component in the positive electrode active material.

20. A battery comprising:
a positive electrode including the positive electrode active material according to claim 1;
a negative electrode; and
an electrolyte.

21. The battery according to claim 20,
wherein the negative electrode includes at least one selected from the group consisting of:
(i) a negative electrode active material capable of occluding and releasing lithium ions; and
(ii) a material that allows lithium metal to dissolve from the material into the electrolyte during discharging and to precipitate on the material during charging, and
wherein the electrolyte is a nonaqueous electrolyte.

22. The battery according to claim 20,
wherein the negative electrode includes at least one selected from the group consisting of:
(i) a negative electrode active material capable of occluding and releasing lithium ions; and
(ii) a material that allows lithium metal to dissolve from the material into the electrolyte during discharging and to precipitate on the material during charging, and
wherein the electrolyte is a solid electrolyte.

23. The positive electrode active material according to claim 1,
wherein the second lithium composite oxide is represented by a composition formula (2), $$Li_a A_b O_c \tag{2}$$

where
A is at least one element selected from the group consisting of Ni, Co, Mn, Nb, Si, Al, P, S, Ti, V, Cr, Fe, Cu, Zn, Ga, Zr, Nb, Mo, Ru, Ta, and W, and
the following three mathematical formulas are satisfied:

$$0 < a \leq 2,$$

$$1.8 \leq b \leq 2.2,\ \text{and}$$

$$3.5 \leq c \leq 4.5.$$

24. The positive electrode active material according to claim 5,
wherein the second lithium composite oxide is represented by a composition formula (2), $$Li_a A_b O_c \tag{2}$$

where
A is at least one element selected from the group consisting of Ni, Co, Mn, Nb, Si, Al, P, S, Ti, V, Cr, Fe, Cu, Zn, Ga, Zr, Nb, Mo, Ru, Ta, and W, and
the following three mathematical formulas are satisfied:

$$0 < a \leq 2,$$

$$1.8 \leq b \leq 2.2,\ \text{and}$$

$$3.5 \leq c \leq 4.5.$$

* * * * *